(12) United States Patent
Vilag et al.

(10) Patent No.: US 10,946,563 B2
(45) Date of Patent: Mar. 16, 2021

(54) EXPANDING FOAM PRESENCE SENSOR AND RELATED METHODS

(71) Applicant: Sealed Air Corporation (US), Charlotte, NC (US)

(72) Inventors: Brian Vincent Vilag, Naugatuck, CT (US); Kenneth John Mierzejewski, Harwinton, CT (US); Steven Edward Maston, Harwinton, CT (US); Steven Joseph Gal, Charlotte, NC (US)

(73) Assignee: Sealed Air Corporation (US), Charlotte, NC (US)

( * ) Notice: Subject to any disclaimer, the term of this patent is extended or adjusted under 35 U.S.C. 154(b) by 251 days.

(21) Appl. No.: 16/072,455

(22) PCT Filed: Feb. 17, 2017

(86) PCT No.: PCT/US2017/018306
§ 371 (c)(1),
(2) Date: Jul. 24, 2018

(87) PCT Pub. No.: WO2017/143143
PCT Pub. Date: Aug. 24, 2017

(65) Prior Publication Data
US 2019/0030767 A1    Jan. 31, 2019

Related U.S. Application Data

(60) Provisional application No. 62/297,468, filed on Feb. 19, 2016.

(51) Int. Cl.
*B29C 44/18* (2006.01)
*B29C 44/60* (2006.01)
(Continued)

(52) U.S. Cl.
CPC ........ *B29C 44/182* (2013.01); *B01F 3/04446* (2013.01); *B01F 11/0065* (2013.01);
(Continued)

(58) Field of Classification Search
CPC ... B29C 44/182; B29C 44/60; B01F 3/04446; B01F 11/0065; B29K 2075/00; G01N 27/223
See application file for complete search history.

(56) References Cited

U.S. PATENT DOCUMENTS 6,386,850 B1 *   5/2002   Salerno ................... B29C 44/16
                                                            425/112
6,625,956 B1     9/2003   Soudan
(Continued)

FOREIGN PATENT DOCUMENTS

| CN | 101358868 A | 2/2009 |
| DE | 3247564 A1  | 7/1984 |
| JP | S6468649 A  | 3/1989 |

OTHER PUBLICATIONS

International Searching Authority, Invitaion to Pay Additional Fees for Application No. PCT/US2017/018306, dated May 29, 2017, 16 pages, European Patent Office, Netherlands.
(Continued)

*Primary Examiner* — P. Macade Nichols
(74) *Attorney, Agent, or Firm* — Jon M. Isaacson

(57) ABSTRACT

Various embodiments are directed to sensor apparatuses configured to detect the presence of foam forming composition in various regions within a foam dispensing apparatus. In various embodiments, the foam dispensing apparatus comprises a dispensing nozzle positioned between at least two container-forming layers and configured to dispense foam forming composition into a container interior formed by the container-forming layers. The sensing apparatus may be positioned external to the container interior, on an oppo-
(Continued)

site side of a container-forming layer relative to the nozzle, and the sensing apparatus may be configured to detect whether foam forming composition is present within a field of view of the sensing apparatus, which encompasses a portion of the container interior. The sensing apparatus may comprise a contactless temperature sensor configured to detect the presence of foam forming composition based on the detected temperature of a surface within the field of view of the sensor apparatus.

16 Claims, 11 Drawing Sheets

(51) Int. Cl.
  B01F 3/04 (2006.01)
  B01F 11/00 (2006.01)
  B29K 75/00 (2006.01)
  G01N 27/22 (2006.01)
(52) U.S. Cl.
  CPC .......... *B29C 44/60* (2013.01); *B29K 2075/00* (2013.01); *G01N 27/223* (2013.01)

(56) References Cited

U.S. PATENT DOCUMENTS

| | | | |
|---|---|---|---|
| 8,501,061 | B2 | 8/2013 | Sperry et al. |
| 9,476,752 | B2 | 10/2016 | Vilag et al. |
| 2002/0048649 | A1 | 4/2002 | Yamashita et al. |
| 2009/0056286 | A1 | 3/2009 | Bertram et al. |
| 2010/0044907 | A1 | 2/2010 | Burke et al. |
| 2012/0261028 | A1 | 10/2012 | Gray et al. |
| 2017/0137591 | A1* | 5/2017 | Mukaiyama ........... C08J 9/0038 |

OTHER PUBLICATIONS

International Searching Authority, International Search Report and Written Opinion for Application No. PCT/US2017/018306, dated Jul. 25, 2017, 21 pages, European Patent Office, Netherlands.
Perkinelmer Optoelectronics GMBH & Co. KG, "Datasheet A2TPMI Rev4, Thermophile with Integrated Signal Processing Circuit", Oct. 2003, 21 pages, retrieved from <http://www.perkinelmer.com/CMSResources/Images/44-3456DTS_A2TPMI.pdf> on Jul. 23, 2018.
Texas Instruments, "TMP007 Infrared Thermopile Sensor with Integrated Math Engine", Apr. 2014, 55 pages, retrieved from <https://media.digikey.com/pdf/Data%20Sheets/Texas%20Instruments%20PDFs/TMP007.pdf> on Jul. 23, 2018.

* cited by examiner

EXPANDING FOAM PRESENCE SENSOR AND RELATED METHODS

CROSS REFERENCE TO RELATED APPLICATIONS

This application is a National Stage Application, filed under 35 U.S.C. § 371, of International Application No. PCT/US2017/018306, filed Feb. 17, 2017, which claims priority to U.S. Application No. 62/297,468, filed Feb. 19, 2016; the contents of both of which are hereby incorporated by reference in their entirety.

BACKGROUND

Related Field

Various embodiments are directed to concepts for detecting the presence of expanding foam in various areas, for example, to ensure proper functionality of a foam dispensing system.

Description of Related Art

Particularly in the protective packaging industry, expandable foam dispensing systems may be utilized to create customized protective packaging that contours to the shape of objects to be protected. Such expandable foam is often generated by mixing two or more liquid chemicals to facilitate an exothermic reaction that results in the mixed chemicals changing shape into a solid. During the reaction process, carbon dioxide and/or other gases may be generated and trapped within the quickly-forming solid, thereby causing the chemical mixture to expand while it hardens, often to several times the original volume of the mixed liquid chemicals.

In various applications, the expandable foam may be dispensed into bags or other containers to confine the expandable foam therein. However, if the foam is not properly dispensed into the interior of the container, the foam may undesirably expand to contact portions of the dispenser and cause damage thereto.

Accordingly, a need exists for concepts for ensuring that chemicals utilized to form expandable foam are properly dispensed into desired areas, such as directly within a sealable plastic confining bag or other container in order to minimize the potential damage and/or lost production time that may result from improperly dispensed foam.

BRIEF SUMMARY

Various embodiments are directed to a system for dispensing foam forming composition. In various embodiments, the system comprises: a dispensing nozzle positioned within a container interior defined at least in part by at least two container-forming layers, the dispensing nozzle configured to dispense foam forming composition into the container interior; and at least one sensing apparatus positioned external to the container interior, wherein the sensing apparatus defines a detection field of view encompassing a portion of the container interior, and the sensor apparatus is configured to detect the presence of foam forming composition within the portion of the container interior within the detection field of view.

In various embodiments, the sensing apparatus comprises a temperature sensor, and the detection field of view encompasses a portion of the at least one container-forming layer, and wherein the sensing apparatus is configured to detect the presence of foam forming composition within the portion of the container interior within the detection field of view based at least in part on a detected temperature of the portion of the at least one container-forming layer positioned within the detection field of view. In various embodiments, the temperature sensor is an infrared temperature sensor. Moreover, in certain embodiments, the temperature sensor is configured to output a detection voltage indicative of the detected temperature of the portion of the at least one container-forming layer positioned within the detection field of view; and the sensing apparatus further comprises: a reference voltage source configured to output a reference voltage; and an onboard controller. The onboard controller may be configured to: receive the detection voltage and the reference voltage, determine whether the detection voltage exceeds the reference voltage, and upon a determination that the detection voltage exceeds the reference voltage, generate a digital signal indicative of the presence of foam forming composition within the portion of the container interior within the detection field of view. Moreover, in various embodiments, the sensing apparatus is additionally configured to detect an ambient temperature, and wherein the detection of the presence of foam forming composition within the portion of the container interior within the detection field of view is based at least in part on a comparison between the ambient temperature and the detected temperature of the portion of the at least one container-forming layer positioned within the detection field of view. In certain embodiments, the sensor apparatus further comprises an onboard controller configured to: receive signals from the sensor, wherein the signals comprise a first signal indicative of the detected temperature of the portion of the at least one container-forming layer positioned within the detection field of view and a second signal indicative of the detected ambient temperature; and generate an analogue signal indicative of the detected temperature of the portion of the at least one container-forming layer positioned within the detection field of view and the detected ambient temperature.

In various embodiments, the sensing apparatus comprises a capacitive sensor, and wherein the sensing apparatus is configured to detect the presence of foam forming composition within the portion of the container interior within the detection field of view based at least in part on a detected capacitance of the field of view.

In certain embodiments, the sensing apparatus is positioned such that the detection field of view encompasses a portion of the container interior in which foam forming composition is not expected. Moreover, in various embodiments, the system additionally comprises a central controller. The central controller may be configured to receive signals from the sensing apparatus indicative of the presence of foam forming composition within the portion of the container interior within the detection field of view; and in response to receipt of a signal indicating that foam forming composition is present within the portion of the container interior within the detection field of view, cause the system to perform one or more remedial actions. The remedial actions may be selected from: moving a portion of the at least two container-forming layers out of the system, or preventing and/or stopping the dispensing of foam forming composition from the nozzle.

In various embodiments, the sensing apparatus is positioned such that the detection field of view encompasses a portion of the container interior in which foam forming composition is expected. Moreover, in various embodiments, the system further comprises a central controller configured to: receive signals from the sensing apparatus indicative of the presence of foam forming composition within the portion of the container interior within the detection field of view; and in response to receipt of a signal indicating that foam forming composition is not present within the portion of the container interior within the detection field of view, cause the system to perform one or more remedial actions. The remedial actions may be selected from: moving a portion of the at least two container-forming layers out of the system, or preventing and/or stopping the dispensing of foam forming composition from the nozzle.

In various embodiments, the at least one sensing apparatus comprises a plurality of sensing apparatuses each defining a corresponding detection field of view encompassing a portion of the container interior, wherein the detection fields of view of the plurality of sensing apparatuses do not substantially overlap. Moreover, the plurality of sensing apparatuses may comprise a first group of at least one sensing apparatus positioned at a first location; and a second group of at least one sensing apparatus positioned at a second location, wherein the detection fields of view corresponding to the at least one sensing apparatus of the second group are downstream of the detection fields of view corresponding to the at least one sensing apparatus of the first group, such that the first group of at least one sensing apparatus is configured to detect the presence of foam forming composition before the second group of at least one sensing apparatus.

Various embodiments are directed to a sensing apparatus configured to detect the presence of foam forming composition. The sensing apparatus may comprise: a sensor positioned external to a container defined by one or more container walls and containing foam forming composition, wherein the sensor defines a detection field of view encompassing a portion of at least one container wall, and wherein the sensor is configured to detect a temperature of the portion of the container wall positioned within the detection field of view; and one or more controllers configured to determine whether the detected temperature of the portion of the container wall is indicative of the presence of foam forming composition within the container and adjacent the portion of the container wall.

Moreover, the sensor is additionally configured to detect an ambient temperature; and the one or more controllers comprises: an onboard controller configured to receive signals from the sensor, wherein the signals comprise a first signal indicative of the temperature of the portion of the container wall positioned within the detection field of view and a second signal indicative of the detected ambient temperature; and a central controller configured to receive an analogue signal from the onboard controller indicative of the temperature of the portion of the container wall positioned within the detection field of view and the detected ambient temperature, and to determine whether the analogue signal is indicative of the presence of foam forming composition within the container and adjacent the portion of the container wall. Moreover, the sensing apparatus may further comprise a reference voltage source configured to provide a reference voltage input to the one or more controllers; and wherein the sensor is configured to supply a detection voltage to the one or more controllers, wherein the detection voltage is indicative of a detected temperature of the portion of the container wall positioned within the detection field of view; and determining whether the detected temperature of the portion of the container wall is indicative of the presence of foam forming composition within the container and adjacent the portion of the container wall comprises determining whether the detection voltage is greater than the reference voltage. In various embodiments, the one or more controllers comprise: an onboard controller configured to determine whether the detection voltage is greater than the reference voltage and to generate a digital signal indicative of whether the detection voltage is greater than the reference voltage; and a central controller configured to receive the digital signal from the onboard controller and to determine whether the digital signal is indicative of the presence of foam forming composition within the container and adjacent the portion of the container wall. In various embodiments, the sensor is an infrared temperature sensor.

Various embodiments are directed to a method for detecting the presence of foam forming composition, the method comprising steps for: receiving a temperature signal from a temperature sensor, wherein the temperature sensor is positioned external to a container interior defined between two or more container-forming layers and wherein the temperature sensor is configured to detect the temperature of a portion of a container-forming layer positioned within a field of view of the sensor; determining whether the received temperature signal satisfies one or more reference criteria; and determining, based on whether the detected temperature satisfies one or more reference criteria, whether the detected temperature is indicative of the presence of foam forming composition within the field of view of the sensor. Moreover, various embodiments additionally comprise steps for receiving an ambient temperature signal from the temperature sensor; and wherein determining whether the received temperature signal satisfies the one or more reference criteria comprises determining a difference between the received temperature signal and the received ambient temperature signal.

In various embodiments, the method additionally comprises steps for: upon determining that the detected temperature is indicative of the presence of foam forming composition within the field of view, generating a signal to cause a dispensing apparatus to perform one or more remedial actions. Alternatively, in various embodiments, the method additionally comprises steps for: upon determining that the detected temperature is not indicative of the presence of foam forming composition within the field of view, generating a signal to cause a dispensing apparatus to perform one or more remedial actions. In various embodiments, the remedial actions may be selected from: moving a portion of the at least two container-forming layers out of the dispensing apparatus, or preventing and/or stopping the dispensing of foam forming composition by the dispensing apparatus.

Finally, various embodiments are directed to a computer-program product comprising a non-transitory computer readable storage medium having program code portions stored thereon. In various embodiments, the program code portions are configured when said computer program product is run on a control device to: cause the control device to receive a temperature signal from a temperature sensor, wherein the temperature sensor is positioned external to a container interior defined between two or more container-forming layers and wherein the temperature sensor is configured to detect the temperature of a portion of a container-forming layer positioned within a field of view of the sensor; determine whether the received temperature signal satisfies one or more reference criteria; and determine, based on whether the detected temperature satisfies one or more reference criteria, whether the detected temperature is indicative of the presence of foam forming composition within the field of view of the sensor.

In various embodiments, the program code portions are additionally configured when said computer program product is run on a control device to: receive an ambient temperature signal from the temperature sensor; and wherein determining whether the received temperature signal satisfies the one or more reference criteria comprises determining a difference between the received temperature signal and the received ambient temperature signal.

In various embodiments, the program code portions are additionally configured when said computer program product is run on a control device to: upon determining that the detected temperature is indicative of the presence of foam forming composition within the field of view, generate a signal to cause a dispensing apparatus to perform one or more remedial actions. Alternatively, in various embodiments, the program code portions are additionally configured when said computer program product is run on a control device to: upon determining that the detected temperature is not indicative of the presence of foam forming composition within the field of view, generate a signal to cause a dispensing apparatus to perform one or more remedial actions. In certain embodiments, the remedial actions may be selected from: moving a portion of the at least two container-forming layers out of the dispensing apparatus, or preventing and/or stopping the dispensing of foam forming composition by the dispensing apparatus.

BRIEF DESCRIPTION OF THE FIGURES

Reference will now be made to the accompanying drawings, which are not necessarily drawn to scale, and wherein.

DETAILED DESCRIPTION OF VARIOUS EMBODIMENTS

Figure 1:
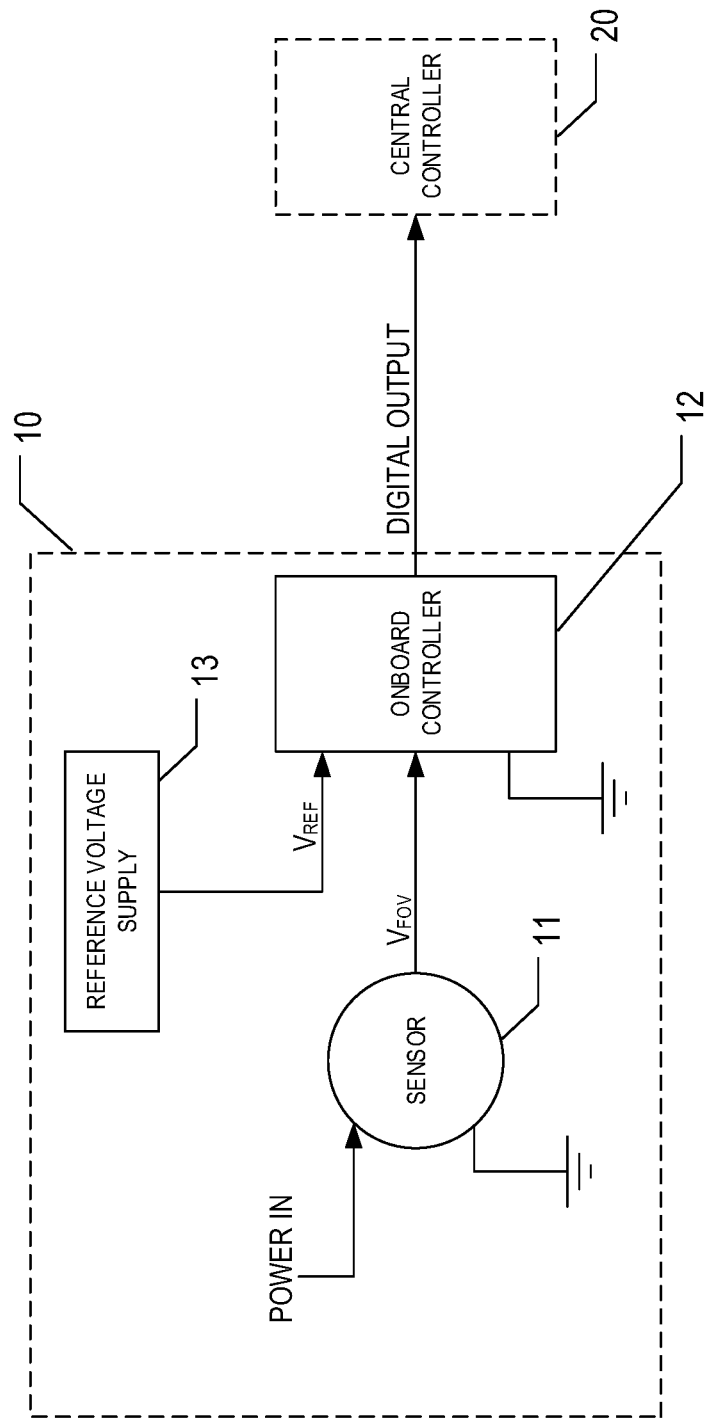
FIG. 1 is a schematic diagram of a sensing apparatus according to some example embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

Expanding foam (e.g., urethane-based foam) utilized to generate foam packaging materials is often generated by mixing two chemicals (e.g., liquid chemicals) immediately prior to and/or immediately after dispensing the two chemicals into a desired location. The two chemicals, upon being mixed, may collectively form a foam forming composition that undergoes an exothermic chemical reaction during which the foam forming composition forms a solid material. During the chemical reaction, carbon dioxide and/or other gases are released and trapped within pockets of the forming solid, thereby forming an expanded cellular plastic commonly referred to as foam. The chemical reaction often releases detectable heat during the formation of the solid and the release of the carbon dioxide and/or other gases.

In various applications, the liquid chemicals are dispensed into a bag or other container, where they are then mixed and allowed to expand during the resulting chemical reaction. For example, foam-in-bag packaging systems may be configured to dispense the liquid chemicals into a thin plastic bag that is subsequently sealed to confine the mixed chemicals within the bag and to ensure that the generated foam does not undesirably contact surfaces outside of the bag, such as surfaces of the dispenser itself, an object to be protected, and/or the like. Because the foam expands and contours to objects it encounters during the expansion process, the foam can easily expand into small crevices, around sensitive mechanical and/or electrical components, and/or the like, and can thereby cause costly damage to such components when allowed to expand outside of a confining bag or other container.

Unfortunately, expandable foam dispensers configured for generating foam-in-bag packaging materials such as those mentioned herein may be subject to occasional instances in which the liquid chemicals may be improperly allowed to expand outside of the intended plastic bag. For example, small defects in the plastic film utilized to form the bag may allow the chemicals to leak out of the bag, and/or misalignment between an open end of the bag and the chemical dispensing nozzles (e.g., due to a bag jam) may result in the chemicals being dispensed improperly such that the foam may be permitted to expand unimpeded by the bag itself. Such instances may result in foam being allowed to expand into undesirable areas, such as areas within the dispensing apparatus itself, and/or into the environment surrounding the dispensing apparatus.

Example foam-in-bag packaging material production processes are described in U.S. Pat. No. 8,501,061 and U.S. Patent Publication No. 2012/0261028, each of which is incorporated herein by reference in their entirety. As discussed in these references, the production of foam-in-bag packaging materials may comprise moving one or more continuous webs of plastic through a dispensing apparatus. These one or more continuous webs of plastic (e.g., two separate plastic plies sealed together on lateral sides and/or a single plastic ply folded into a C-shape and sealed along the open edge opposite the fold) may each define container-forming layers that may ultimately be formed into closed bags by sealing an edge of the one or more container-forming layers that defines the end of the continuous web. The dispensing apparatus may then dispense foam forming composition into a container interior located between the container-forming layers toward the sealed end of the container-forming layers that ultimately defines an end of the formed bag. The portion of the container-forming layers enclosing the foam may then be sealed and separated from the remainder of container-forming layers to form a sealed bag containing foam forming composition. The foam forming composition may then be mixed within the bag, and is then permitted to expand within the sealed bag, which operates to confine the expanding foam forming composition to prevent the foam forming composition from undesirably directly contacting any surfaces external to the bag (e.g., surfaces of an object being secured by the foam-in-bag packaging material, and/or surfaces of the foam dispensing apparatus itself). As just one specific example, after dispensing the foam forming composition into a bag and sealing the bag, the bag may be placed into a shipping container, and an object to be packaged therein may be placed in contact with an exterior surface of the bag, such that the foam may expand around the object while remaining confined within the bag to provide a contoured protective packaging within the shipping container.

Various embodiments comprise a sensing apparatus configured to detect the presence of foam forming composition at various locations in order to ensure that the foam forming composition is properly dispensed to ultimately satisfy desired foam positioning, and/or other characteristics. Accordingly, the sensing apparatus of various embodiments are configured to detect the presence of foam forming composition in undesirable locations, such as proximate a determined end of a bag prior to sealing of the bag. In various embodiments, the sensing apparatus may be positioned external to the container-forming layers and within the dispensing apparatus (e.g., external to the plastic web utilized to ultimately form the bags), and may have a field of view trained on an exterior surface of at least one of the container-forming layer. For example, such sensing apparatus may comprise a non-contact temperature sensor, such as an infrared temperature sensor, having a field of view encompassing areas in which expanding foam forming composition should not be located. For example, the field of view may be trained on an exterior surface of the container-forming layer, at a position where foam forming composition should not be present while the container-forming layers remain present within the dispensing apparatus.

In various embodiments, the field of view of the temperature sensor may encompass a region within a foam dispensing apparatus between a dispensing nozzle and a bag sealing apparatus and between the one or more container-forming layers, collectively defining a container interior, at a location where expanding foam forming composition should not be present during normal operation of the dispensing apparatus. The temperature sensor may be configured to detect the heat emitted by the foam forming composition and transmitted from the container interior through the container-forming layer during the exothermic chemical reaction by comparing the temperature detected by the sensor against a predefined threshold temperature; and/or against a detected ambient temperature. The detection of a temperature that satisfies the predefined threshold temperature within the field of view of the sensor may be indicative of foam forming composition being located in an undesirable region, such that the system may take remedial action before the foam undesirably contacts surfaces external to the formed bag. For example, the system may stop the dispensing of the foam forming composition and/or move an improperly filled bag out of the dispensing apparatus by causing one or more container-forming layer feed rollers to move the container-forming layers out of the dispensing apparatus. Such remedial actions may be instituted before the foam is permitted to expand into components of the dispensing apparatus itself.

In yet other embodiments, the sensing apparatus may be positioned to detect the presence of foam forming composition in areas in which the foam forming composition is desirably located. For example, the sensing apparatus may be positioned such that a field of view of the sensing apparatus encompasses a portion of a container-forming layer (e.g., a portion of a previously formed bag) and an adjacent portion of a container interior in which foam is expected to expand during normal operation of the dispensing apparatus. In various embodiments, the sensing apparatus may be configured such that, if no heat is detected within the field of view of the sensing apparatus at a predefined time (e.g., within a predefined time interval after the dispensing apparatus completes dispensing foam into the bag to be formed), the dispensing apparatus may take remedial action, such as moving the bag out of the dispensing apparatus.

As yet another example, a sensing apparatus may be positioned to detect the presence of foam forming composition at desired locations within a shipping container and/or another container. For example, the sensing apparatus may be configured such that a field of view of the sensing apparatus encompasses a packing location where foam forming composition is placed into a shipping container (e.g., a bag containing expanding foam forming composition is placed into a shipping container) and/or any other container, to ensure that the foam is properly expanding to fill desired regions of the container. Various embodiments may be positioned such that the field of view of the sensor encompasses an open side of the container (e.g., an open top of the container) to detect the temperature of an external surface of the foam itself and/or of a bag (e.g., defined by one or more container-forming layers) containing the foam; and/or the field of view may encompass a closed side of the container, such that the temperature sensor detects a temperature of the container itself. Accordingly, particularly when the container is a heat conductor, and/or is sufficiently thin to provide minimal temperature insulation between the interior of the container and the external surfaces of the container, such that the temperature of the exterior of the container is indicative of the temperature within the container, the sensing apparatus may ensure that foam is properly expanded within the container.

In various embodiments, the sensing apparatus may comprise a capacitive sensor in addition to, or as an alternative to the temperature sensor. The capacitive sensor may be configured to detect changes in capacitance within a field of view of the sensor, which is influenced by the amount of water content detected within the field of view of the sensor. Thus, for foam forming compositions containing some amount of water, a capacitive sensor may be utilized to detect the presence of the foam forming composition within the field of view of the sensor apparatus.

Sensing Apparatus

Figure 2:
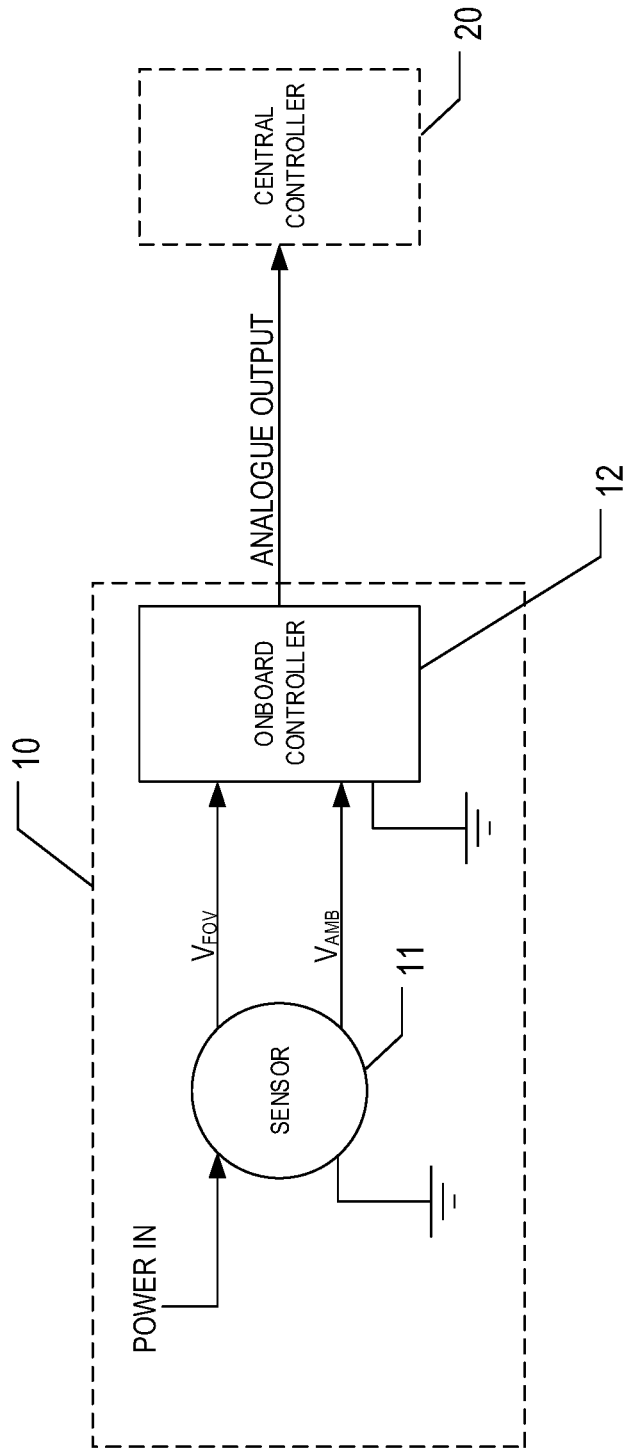
FIG. 2 is a schematic diagram of a sensing apparatus according to some example embodiments.
Figure 3:
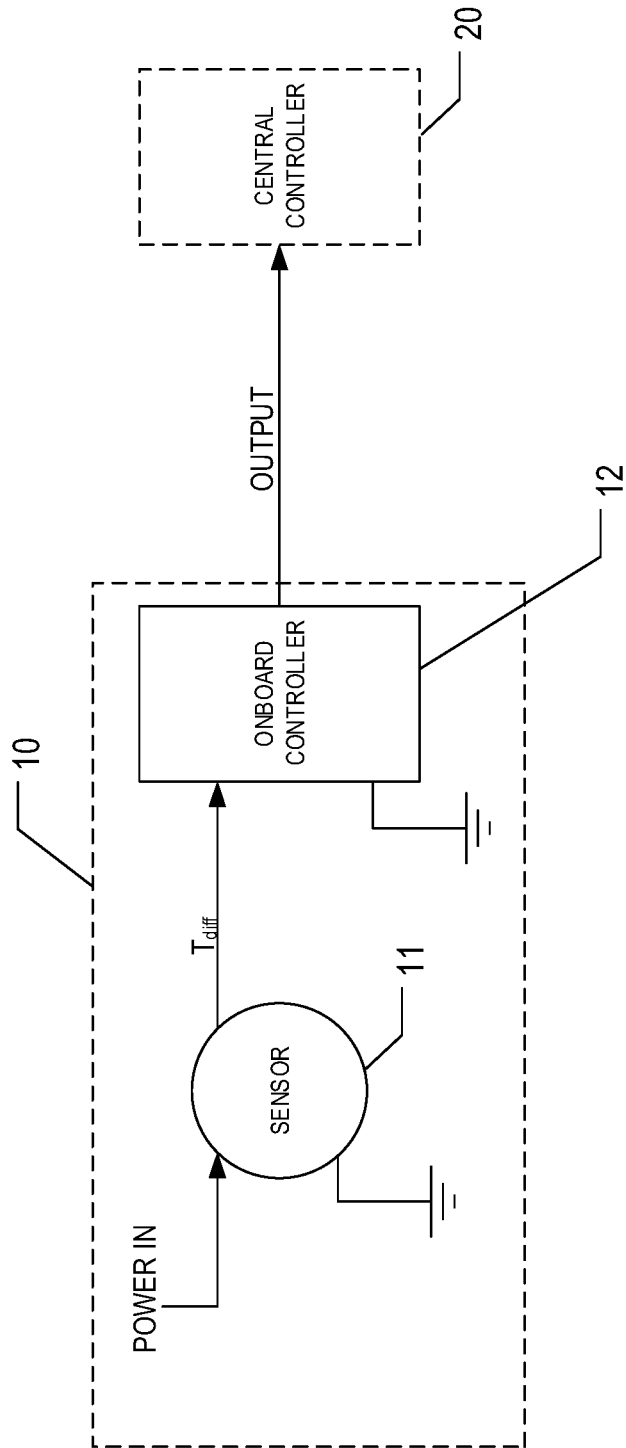
FIG. 3 is a schematic diagram of a sensing apparatus according to some example embodiments.

Referring first to FIGS. 1-3, which illustrate schematic diagrams of sensing apparatuses according to various embodiments, such sensing apparatus may provide a digital output indicative of a detection of foam forming composition (as shown in FIGS. 1 and 3) and/or an analogue output indicative of raw data collected by the sensing apparatus (as shown in FIG. 2). The output of the sensing apparatus may be provided to the central controller 20 of a dispensing apparatus 1, such as those shown schematically in FIGS. 4A-9. In various embodiments, the central controller 20 may comprise one or more non-transitory computer-readable storage mediums and/or one or more processors configured to execute portions of computer program products stored on the computer-readable storage mediums.

As discussed herein, upon mixing the chemicals of the foam forming composition, the foam forming composition undergoes an exothermic chemical reaction that releases a detectable amount of heat while the foam forming composition is undertaking the state change from a liquid to a solid and gas mixture (e.g., a solid having trapped pockets of carbon dioxide and/or other gases therein). In various embodiments, the foam forming composition is positioned within a container interior located between container-forming layers, and on an opposite side of at least one container-forming layer relative to a sensing apparatus. In such embodiments, the sensing apparatus is positioned external to the container interior, and defines a field of view encompassing at least a portion of the container interior between the two or more container-forming layers. In various embodiments, the container-forming layers are sufficiently thin (e.g., less than 12 mils, less than 6 mils, less than 3 mils, and/or the like) such that heat generated by the exothermic reaction of the foam forming composition is conducted through the portion of the container-forming layers immediately adjacent the foam forming composition, such that the temperature of the exterior of the container-forming layers is indicative of the temperature on the interior surface of the container-forming layer. Moreover, in various embodiments, the container-forming layers may not substantially conduct heat across the surface of a container-forming layer, and accordingly the temperature detected at a particular location on the surface of the container-forming layer is a location-specific temperature, such that the detected temperature is not substantially influenced by the temperature of surrounding locations. For example, the detected temperature of a particular portion of the container-forming layer that is not adjacent any exothermically reacting foam forming composition within the container interior is not substantially raised due to the presence of exothermically reacting foam forming composition adjacent a portion of the container-forming layer located a distance away from the sensed location.

As discussed herein, the container-forming layers may comprise flexible thin plastic plies that are sealed relative to one another to form sealed plastic bags containing the foam forming composition. In various embodiments, the container-forming layers may comprise flexible, rigid, and/or semi-rigid plastic plies, thin paper plies, thin cardboard plies, metallic and/or other conductive materials, and/or the like.

Figure 4A:
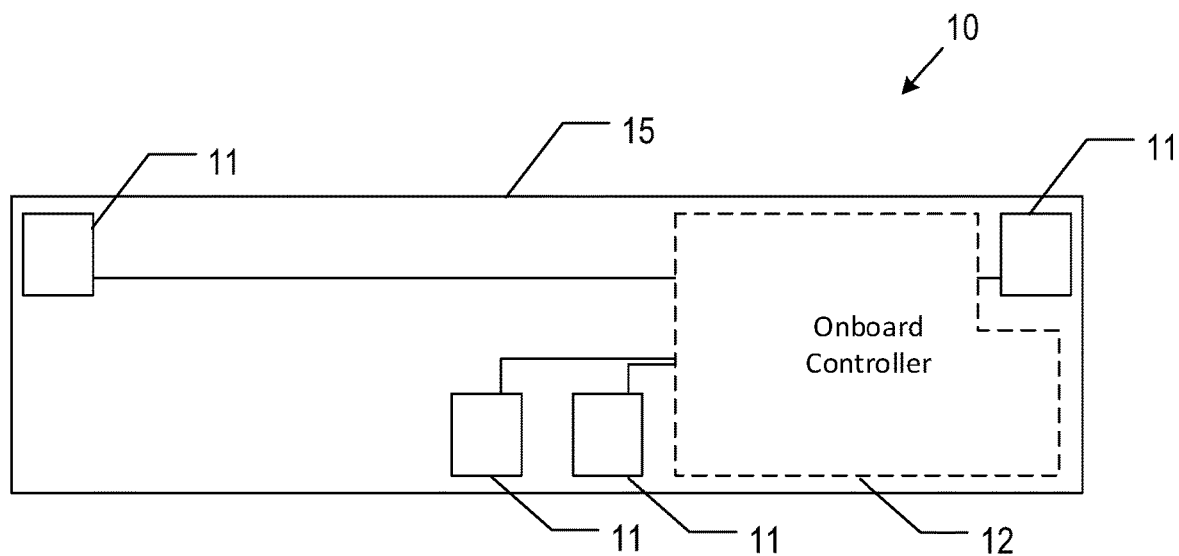
FIGS. 4A-4B are schematic diagrams of a printed circuit board having a plurality of sensing apparatuses secured thereto, according to some example embodiments.
Figure 4B:
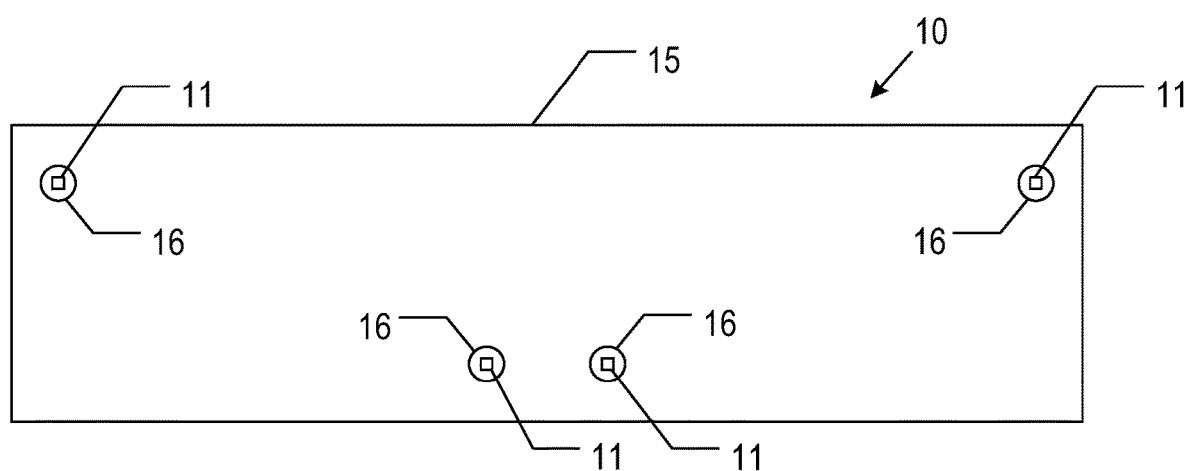

FIG. 1 shows a schematic diagram of a sensing apparatus 10 configured to provide a digital output signal indicative of the detection of the presence of foam forming composition within the field of view of an included sensor 11. In various embodiments, the sensing apparatus 10 may comprise a sensor 11, one or more on-board controllers 12 (e.g., one or more integrated circuits, microcontrollers, and/or the like, and/or one or more controllers comprising a non-transitory computer readable storage medium and/or one or more processors), a reference voltage source 13, and/or various other electrical circuit components (e.g., surge protectors, power supplies, and/or the like). In various embodiments, the components of the sensing apparatus may be secured (e.g., electronically and/or mechanically) to a Printed Circuit Board (PCB) 15 (shown in FIGS. 4A-4B) providing electrical connections between the various components of the sensing apparatus 10. Thus, for example, the sensor 11, the onboard controller 12, and/or the reference voltage source 13 may be mechanically secured to the PCB 15 (e.g., via soldering). With reference briefly to FIGS. 4A-4B, one or more sensors 11 may be mechanically and electrically secured to a back side of the PCB 15 such that the sensor is configured to detect the temperature of a surface (e.g., one or more of the plastic plies) from a distance and through an aperture 16 formed in the PCB 15.

In certain embodiments, various components may be electronically secured relative to one another via one or more separate conductors (e.g., stranded and/or solid-core wires), which may be secured relative to the PCB 15, and/or directly to each of the one or more components of the sensing apparatus 10. In various embodiments, multiple sensing apparatuses 10 may be disposed on a single PCB 15 (as shown, for example, in FIGS. 4A-4B).

Moreover, as discussed herein, the sensor 11 may be a contactless temperature sensor configured to detect the temperature of a surface positioned within the field of view of the sensor 11 positioned some distance away from the sensor 11. For example, the sensor 11 may be an infrared temperature sensor configured to detect the temperature of a surface within the field of view of the sensor 11. As a specific example, the sensor 11 may be an integrated remote temperature sensor with a small field of view, such as the A2TPMI 334-L5.5 OAA120 sensor manufactured by PerkinElmer of Waltham, Mass., or the TMP007 Infrared Thermopile Sensor with Integrated Math Engine manufactured by Texas Instruments of Dallas, Tex. In various embodiments, the sensor 11 may have a field of view of ±3.5 degrees from a centerline extending perpendicularly away from a sensing surface of the sensor 11, however the sensor may alternative have any of a variety of fields of view. As yet another example, various embodiments may comprise a sensor having a field of view of ±45 degrees from a centerline extending perpendicularly away from a sensing surface of the sensor 11. As discussed herein, when positioned to detect foam forming composition within a dispensing apparatus, the sensor apparatus 10 may be positioned such that the field of view of the sensor 11 encompasses approximately a 4-inch square area on the surface of a container-forming layer and an adjacent volume within the container interior. In various embodiments, the effective field of view of a portion of the container-forming layer may be defined at least in part by one or more objects for which foam forming composition is not expected to contact. For example, the portion of the field of view of a sensor 11 consisting of the container-forming layer may be defined on one or more sides by drive rollers and/or by one or more support frame members. In such embodiments, the sensor 11 may be configured to detect the temperature of the various components defining the perimeter of the field of view as well as the temperature of the container-forming layer within the field of view of the sensor. However, because the temperature of the various components defining the perimeter of the field of view is expected to remain relatively constant, a change in temperature detected by the sensor 11 may be attributable to the presence of foam forming composition adjacent the container-forming layer within the field of view of the sensor 11. As yet another example, the effective field of view of a portion of the container-forming layer may be defined by an aperture member corresponding to the sensor 11. For example, the aperture member may define an aperture through which a portion of the container-forming layer is within the field of view of the sensor 11. In such embodiments, the aperture member may be configured such that the field of view of the sensor 11 encompasses a portion of the container-forming layer and a portion of the aperture member, but it does not encompass other components of the dispenser apparatus 1. Accordingly, the aperture member may ensure that any temperature increases detected within the field of view of the sensor 11 are attributable only to increases in temperature of the container-forming layer.

As shown in FIG. 1, the sensor 11 may receive a power input, and may provide one or more output signals indicative of temperatures detected by the sensor 11. As shown in FIG. 1, the sensor 11 may provide a detection voltage output $V_{FOV}$ indicative of a temperature detected within the field of view of the sensor 11. The detection voltage output $V_{FOV}$ may be an analogue voltage signal for which the detection voltage output $V_{FOV}$ is indicative of the temperature detected by the sensor 11. A conversion equation (e.g., a polynomial) may be utilized to determine the temperature detected by the sensor 11 based on the detection voltage output $V_{FOV}$ of the sensor 11.

Referring again to FIG. 1, the detection voltage output $V_{FOV}$ of the sensor 11 may be electronically communicated (e.g., via Inter-Integrated Circuit (I2C) communication, Serial Peripheral Interface (SPI) communication, RS232 standard communication, and/or the like) to the onboard controller 12, which may be configured to determine whether the detection voltage output $V_{FOV}$ of the sensor 11 is indicative of the presence of foam forming composition within the field of view of the sensor 11. The onboard controller 12 may additionally receive a reference voltage signal $V_{REF}$ as input, and may compare the detection voltage output $V_{FOV}$ of the sensor and the reference voltage signal $V_{REF}$. Upon a determination that the detection voltage output $V_{FOV}$ is greater than the reference voltage signal $V_{REF}$, the onboard controller 12 may generate a digital signal output indicative of the presence of foam forming composition within the field of view of the sensor 11. Upon a determination that the detection voltage output $V_{FOV}$ is less than the reference voltage signal $V_{REF}$, the onboard controller 12 may generate a digital signal output indicative of the determination that no foam forming composition is detected within the field of view of the sensor 11. In various embodiments, the output of the onboard controller 12 may be a positive voltage (e.g., +3.3, +5V, and/or the like) upon a determination that foam forming composition is detected, and a substantially zero voltage upon a determination that foam forming composition is not detected. However, in various embodiments, the output of the onboard controller 12 may be a substantially zero voltage upon a determination that foam forming composition is detected, and a positive voltage upon a determination that foam forming composition is not detected.

In various embodiments, the reference voltage signal $V_{REF}$ is received from a reference voltage source 13. In various embodiments, the reference voltage source 13 may be configured to output a constant and pre-set output voltage. However, in various embodiments, the reference voltage source 13 may comprise a potentiometer and/or other components configured to provide a configurable reference voltage output $V_{REF}$ that may be modified by a user. Accordingly, the reference voltage may be selected based on attributes of a particular application, such as an expected temperature threshold to be utilized to determine whether foam forming composition has been detected, expected ambient operating conditions, and/or the like.

In the embodiment illustrated in FIG. 1, the output signal of the onboard controller 12 may be provided to a dispensing apparatus central controller 20, which may utilize the output signal to determine whether to institute one or more remedial actions upon the determination that foam forming composition has been detected within the field of view of the sensor 11.

FIG. 2 shows a schematic diagram of a sensing apparatus 10 configured to provide an analogue signal indicative of a detected temperature within a field of view of a sensor 11 and a detected ambient temperature of the sensor 11. In the illustrated embodiment of FIG. 2, the sensing apparatus 10 comprises a sensor 11, and/or one or more on-board controllers 12 (e.g., one or more integrated circuits, microcontrollers, and/or the like). Like the sensing apparatus illustrated in FIG. 1, the one or more components of the sensing apparatus may be secured to a PCB 15 mechanically (e.g., soldered to the PCB) and/or electrically, as shown in FIGS. 4A-4B.

The sensor 11 may be a contactless temperature sensor configured to detect the temperature of a surface positioned within the field of view of the sensor 11 positioned some distance away from the sensor 11. For example, the sensor 11 may be an infrared temperature sensor configured to detect the temperature of a surface within the field of view of the sensor 11. As a specific example, the sensor 11 may be an integrated remote temperature sensor with a small field of view, such as the A2TPMI 334-L5.5 OAA120 sensor manufactured by PerkinElmer of Waltham, Mass., or the TMP007 Infrared Thermopile Sensor with Integrated Math Engine manufactured by Texas Instruments of Dallas, Tex.

As shown in FIG. 2, the sensor 11 may receive a power input, and may provide one or more output signals indicative of temperatures detected by the sensor. As shown in FIG. 2, the sensor 11 may provide a detection voltage output $V_{FOV}$ indicative of a temperature detected within the field of view of the sensor 11, and an ambient output signal $V_{AMB}$ indicative of an ambient temperature detected by the sensor 11. Each of the output signals $V_{FOV}$, $V_{AMB}$ may be analogue voltage signals for which the voltage is indicative of the corresponding temperature detected by the sensor 11. In various embodiments, a first conversion equation (e.g., a polynomial) may be utilized to determine the FOV temperature detected by the sensor 11 based on the detection voltage output $V_{FOV}$, and a second conversion equation (e.g., a polynomial) may be utilized to determine the ambient temperature detected by the sensor 11 based on the ambient output voltage $V_{AMB}$.

Referring again to FIG. 2, the detection voltage output $V_{FOV}$ and the ambient output voltage $V_{AMB}$ may be electronically communicated (e.g., via Inter-Integrated Circuit (I2C) communication, Serial Peripheral Interface (SPI) communication, RS232 standard communication, and/or the like) to the onboard controller 12, which may be configured to provide one or more analogue and/or digital output signals indicative of the detected FOV temperature and the detected ambient temperature.

In various embodiments, the output signal of the onboard controller 12 may be provided to a dispensing apparatus central controller 20, which may be configured to determine whether the received analogue and/or digital output signal indicates that foam forming composition is detected within the field of view of the sensor 11. Upon a determination that foam forming composition has been detected within the field of view of the sensor 11, the dispensing apparatus central controller 20 may be configured to institute one or more remedial actions. In certain embodiments, the onboard controller 12 may be configured to determine whether foam forming composition is detected within the field of view of the sensor 11, and the onboard controller 12 may be configured to provide an output signal (e.g., analogue or digital) indicative of whether foam forming composition is detected within the field of view of the sensor 11. Moreover, the onboard controller 12 may be configured to output a signal equivalent to the signal provided upon the detection of foam forming composition (or upon a determination that no foam forming composition is detected) upon a determination that a sensor 11 is disconnected and/or is malfunctioning.

For example, in various embodiments, the dispensing apparatus central controller 20 and/or the onboard controller 12 may be configured to compare one or more determined FOV temperature values with one or more detected ambient temperature values to determine whether foam forming composition is detected within the field of view of the sensor 11. As a specific example, the dispensing apparatus central controller 20 and/or the onboard controller 12 may be configured to compare a detected FOV temperature (e.g., as determined based on the detection voltage output $V_{FOV}$) with a moving average ambient temperature value, determined based on a plurality of historical ambient temperature readings (e.g., a plurality of recent ambient temperature readings taken during the most recent 3 minutes, each determined based on the ambient output voltage $V_{AMB}$). As yet another example, the dispensing apparatus central controller 20 and/or the onboard controller 12 may be configured to compare a determined moving average FOV temperature, determined based on a plurality of historical FOV temperature readings (e.g., a plurality of recent FOV temperature readings taken during the most recent 2 seconds) with a moving average ambient temperature value, determined based on a plurality of historical ambient temperature readings (e.g., a plurality of recent ambient temperature readings). In various embodiments, the dispensing apparatus central controller 20 and/or the onboard controller 12 may be configured to determine an appropriate analysis based on determined characteristics of the received signals. For example, the appropriate analysis may be determined based on a detected ambient temperature. For example, a first analysis may be performed upon a determination that the ambient temperature is less than 15 degrees Celsius, a second analysis may be performed upon a determination that the ambient temperature is between 15 degrees and 33 degrees Celsius, and a third analysis may be performed upon a determination that the ambient temperature is greater than 33 degrees Celsius. In various embodiments, each analyses may comprise a different threshold temperature difference between the ambient temperate and the FOV temperature as being indicative of the presence of foam forming composition. In various embodiments, the dispensing apparatus central controller 20 and/or the onboard controller 12 may additionally be configured to determine whether the detected FOV temperature is higher than previous FOV temperatures, by comparing a most recent FOV temperature reading (or small moving average FOV temperature reading, such as the most recent 2 second period) against a reference moving average value (e.g., calculated as the moving average FOV temperature reading taken during the most recent 60 seconds) in order to minimize the number of false positive detections of foam forming composition.

FIG. 3 shows a schematic diagram of a sensing apparatus 10 configured to provide a signal indicative of whether a detected temperature within a field of view of a sensor 11 is indicative of the presence of foam forming composition detected by the sensor 11. In the illustrated embodiment of FIG. 3, the sensing apparatus 10 comprises a sensor 11 and/or one or more on-board controllers 12 (e.g., one or more integrated circuits, microcontrollers, and/or the like). Like the sensing apparatus illustrated in FIG. 1, the one or more components of the sensing apparatus may be secured to a PCB 15 mechanically (e.g., soldered to the PCB) and/or electrically, as shown in FIGS. 4A-4B.

The sensor 11 may be a contactless temperature sensor configured to detect the temperature of a surface positioned within the field of view of the sensor 11 positioned some distance away from the sensor 11. For example, the sensor 11 may be an infrared temperature sensor configured to detect the temperature of a surface within the field of view of the sensor 11. As a specific example, the sensor 11 may be an integrated remote temperature sensor with a small field of view, such as the A2TPMI 334-L5.5 OAA120 sensor manufactured by PerkinElmer of Waltham, Mass., or the TMP007 Infrared Thermopile Sensor with Integrated Math Engine manufactured by Texas Instruments of Dallas, Tex.

In various embodiments, the sensor 11 may comprise one or more integrated controllers configured to detect a temperature difference between the temperature detected within the field of view of the sensor and an ambient temperature detected by the sensor. For example, the sensor may comprise an integrated math engine and an integrated cold-junction reference temperature sensor in order to detect an ambient temperature and to determine a difference between the temperature detected within the field of view of the sensor and the ambient temperature.

For example, in various embodiments, the sensor 11 may be configured to determine a difference between the temperature detected within the field of view of the sensor and the ambient temperature based on a comparison between one or more values indicative of the temperature detected within the field of view of the sensor 11 and one or more values indicative of a detected ambient temperature. As a specific example, the sensor 11 may be configured to compare a value indicative of the temperature detected within the field of view of the sensor 11 with a moving average ambient temperature value, determined based on a plurality of historical ambient temperature values (e.g., a plurality of recent ambient temperature values taken during the most recent 3 minute period). As yet another example, the sensor 11 may be configured to compare a determined moving average field of view temperature value, determined based on a plurality of values indicative of a temperature detected within the field of view of the sensor 11 (e.g., a plurality of recent FOV temperature values taken during the most recent 2 second period) with a moving average ambient temperature value, determined based on a plurality of historical ambient temperature values (e.g., a plurality of recent ambient temperature values). In various embodiments, the onboard controller 12 and/or the dispensing apparatus central controller 20 may be configured to detect a difference in temperature between a temperature detected within the field of view of the sensor 11 and an ambient temperature.

In various embodiments, sensor 11 may be configured to determine an appropriate analysis based on determined characteristics of the received signals. For example, the appropriate analysis may be determined based on a detected ambient temperature. For example, a first analysis may be performed upon a determination that the ambient temperature is less than 15 degrees Celsius, a second analysis may be performed upon a determination that the ambient temperature is between 15 degrees and 33 degrees Celsius, and a third analysis may be performed upon a determination that the ambient temperature is greater than 33 degrees Celsius. In various embodiments, each analyses may comprise a different threshold temperature difference between the ambient temperate and the FOV temperature as being indicative of the presence of foam forming composition. In various embodiments, sensor 11 may additionally be configured to determine whether the detected FOV temperature is higher than previous FOV temperatures, by comparing a most recent FOV temperature reading (or small moving average FOV temperature reading, such as the most recent 2 second period) against a reference moving average value (e.g., calculated as the moving average FOV temperature reading taken during the most recent 60 seconds) in order to minimize the number of false positive detections of foam forming composition.

As shown in FIG. 3, the sensor 11 may receive a power input, and may provide one or more output signals indicative of temperatures detected by the sensor. As shown in FIG. 3, the sensor 11 may provide a temperature signal $T_{diff}$ indicative of the difference in temperature between the temperature detected within the field of view of the sensor and the ambient temperature (e.g., between a value indicative of a moving average temperature detected within the field of view of the sensor and a value indicative of a moving average ambient temperature). The temperature signal $T_{diff}$ may be an analogue signal or a digital signal. In various embodiments, the temperature signal $T_{diff}$ may be electronically communicated (e.g., via Inter-Integrated Circuit (I2C) communication, Serial Peripheral Interface (SPI) communication, RS232 standard communication, and/or the like) to an onboard controller 12 which may be configured to provide a signal (e.g., analogue or digital) indicative of whether the temperature signal $T_{diff}$ is indicative of the presence of foam forming composition within the field of view of the sensor 11.

In various embodiments, the onboard controller 12 is configured to receive temperature signals $T_{diff}$ from a plurality of sensors 11 (e.g., via a serial interface). In such embodiments, the onboard controller 12 may be configured to output one or more signals indicative of whether any of the temperature signals $T_{diff}$ is indicative of the presence of foam forming composition within the field of view of a corresponding sensor 11. In various embodiments, the output signal may provide data specific to each individual sensor 11, and/or may provide data indicative of the temperature signals $T_{diff}$ received from all of the sensors 11 in the aggregate. For example, the output signal may comprise data indicating that one sensor 11 detects the presence of foam forming composition; two sensors detects the presence of foam forming composition; and/or the like. In various embodiments, the output signal of the onboard controller 12 may comprise data indicative of the identity of the sensor 11 detecting (or not detecting) the presence of foam forming composition. For example, the output sensor may indicate that a particular sensor 11 (e.g., as indicated based on a provided label, location, and/or the like corresponding to the sensor) detects foam forming composition, and the remaining sensors do not detect foam forming composition. In various embodiments, the output signal may provide data indicating whether any of the sensors 11, in the aggregate, detect the presence of foam forming composition. For example, the onboard controller 12 may be configured to output one of two signal options depending on whether any of the sensors 11 detects the presence of foam forming composition (e.g., a first signal indicating at least one sensor detects the presence of foam forming composition or a second signal indicating that none of the sensors detects the presence of foam forming composition). As noted herein, the output signal may be digital (e.g., a positive signal indicates at least one sensor 11 detects the presence of foam forming composition, and a negative or zero voltage signal indicates that none of the sensors 11 detects the presence of foam forming composition). Moreover, the onboard controller 12 may be configured to output a signal equivalent to the signal provided upon the detection of foam forming composition (or upon a determination that no foam forming composition is detected) upon a determination that a sensor 11 is disconnected and/or is malfunctioning.

In various embodiments, the output signal of the onboard controller 12 may be provided to a dispensing apparatus central controller 20, which may be configured to determine whether the received analogue and/or digital output signal indicates that foam forming composition is detected within the field of view of the sensor 11. Upon a determination that foam forming composition has been detected within the field of view of the sensor 11, the dispensing apparatus central controller 20 may be configured to institute one or more remedial actions.

In various embodiments, a determination of whether foam forming composition has been detected within the field of view of the sensor 11 comprises comparing the FOV temperature and the ambient temperature, and determining whether the difference between the FOV temperature and the ambient temperature satisfies one or more reference criteria. For example, the reference criteria may specify that a determination that the FOV temperature exceeds the ambient temperature by more than a threshold amount may indicate that foam forming composition has been detected within the field of view of the sensor 11. As a specific embodiment, a determination that the FOV temperature exceeds the ambient temperature by at least 15 degrees Fahrenheit may indicate that foam forming composition has been detected within the field of view of the sensor 11.

In certain embodiments, a determination of whether foam forming composition has been detected within the field of view of the sensor 11 comprises comparing an instantaneous rate of change of the FOV temperature against a reference rate of temperature change. The reference rate of temperature change may inherently accommodate differences in ambient temperature because a temperature change caused by an exothermic chemical reaction that produces foam is likely to raise the temperature by a smaller amount if the ambient temperature is higher.

To utilize a reference rate of temperature change to identify the presence of foam forming composition in the field of view of a sensor 11, the onboard controller 12 and/or central controller 20 may be configured to determine a reference rate of temperature change to be utilized as a datum. The reference rate of change may be preset at the onboard controller 12 and/or the central controller 20 (e.g., based on user input) or the reference rate of change may be automatically determined based on data received from the sensor 11. In those embodiments in which the reference rate of temperature change is calculated based on data received from the sensor 11, the reference rate of change may be newly determined each time the sensing apparatus 10 is initialized, each time the dispenser generates a new foam-in-bag product, and/or the like.

When establishing the reference rate of temperature change, the onboard controller 12 and/or the central controller 20 may be configured to monitor temperature data received from the sensor 11 to identify a difference between a measured ambient temperature and FOV temperature that exceeds a predetermined calibration difference. The predetermined calibration difference may be predefined (e.g., based on user input) prior to beginning the process for determining the reference rate of temperature change. The predetermined calibration difference may be utilized to minimize potential false positive sensing of foam forming composition, by ensuring that actual temperature changes due to the dispensing of foam forming composition from the dispenser cause the temperature changes. Upon detecting the calibration temperature change (e.g., between the ambient temperature and the FOV temperature), the onboard controller 12 and/or the central controller 20 may be configured to wait a predefined time period (e.g., 100 ms, 1 sec, and/or the like) before again recording the FOV temperature. The onboard controller 12 and/or the central controller 20 may then determine the reference change in temperature as the difference between the FOV temperature identified when the calibration temperature change was satisfied and the FOV temperature recorded after the predefined time period, divided by the duration of the predefined time period. The onboard controller 12 and/or the central controller 20 may then store the determined reference change in temperature. In certain embodiments, the onboard controller 12 and/or the central controller 20 may apply a tolerance adjustment to the determined reference rate of temperature change (e.g., adjusting the reference rate of temperature either positively or negatively to incorporate a temperature change tolerance). Again, the tolerance adjustment may be added to the determined reference rate of temperature change to minimize the number of false positive identifications of the presence of foam forming composition within the FOV of the sensor 11.

The onboard controller 12 and/or the central controller 20 may thereafter continue to receive, at known intervals (e.g., 100 ms) FOV temperature data from the sensor 11. The onboard controller 12 and/or the central controller 20 may be configured to continuously calculate an instantaneous rate of temperature change between a most recent temperate data and a prior temperature data (e.g., the previously collected temperature data) over the known interval. The onboard controller 12 and/or the central controller 20 may then compare the instantaneous rate of temperature change against the stored reference rate of temperature change (which may include a tolerance adjustment) to determine whether the instantaneous rate of temperature change exceeds the stored reference rate of temperature change. Upon determining that the instantaneous rate of temperature change exceeds the stored reference rate of temperature change, the onboard controller 12 and/or the central controller 20 may flag the temperature data received from the sensor 11 by generating flag data to be stored at the onboard controller 12 and/or the central controller 20.

In various embodiments, the onboard controller 12 and/or the central controller 20 may be configured to determine that foam forming composition is present within the FOV of the sensor 11 upon flagging a single temperature data point received from the sensor 11. However, in certain embodiments, the onboard controller 12 and/or the central controller 20 may be configured to monitor the number of identified flags, the number of consecutive flags, and/or the like to determine whether the generated flags satisfies a foam-presence criteria. In certain embodiments, the foam-presence criteria may require a predetermined number of consecutive data points to be flagged (e.g., 10) prior to indicating that foam forming composition is present within the FOV of the sensor 11. As yet another example, the foam-presence criteria may require that at least one flag (e.g., a predefined number of consecutive flags) is generated, followed by a predefined number of data points indicating an FOV temperature is more than a threshold temperature above the ambient temperature. As yet another example, the foam-presence criteria may require a predefined number of non-consecutive flags is generated. Various combinations of the above examples may be utilized as a foam-presence criteria.

Moreover, the onboard controller 12 and/or the central controller 20 may operate in accordance with one or more data collection delays to ensure that the one or more sensors 11 are outputting true and/or accurate data prior to the onboard controller 12 and/or the central controller 20 collecting, storing, and/or analyzing the received data.

In various embodiments, the onboard controller 12 and/or the central controller 20 may be configured to establish reference changes in temperature for each sensor 11 individually. However, in various embodiments, a single reference change in temperature may be established and utilized for all sensors 11. Moreover, upon detecting that any of the sensors satisfies the foam-presence criteria, the onboard controller 12 and/or the central controller 20 may be configured to take one or more remedial actions, as discussed herein.

In various embodiments, a sensing apparatus 10 may comprise one or more capacitive sensors configured to detect the presence of water within a field of view of the sensors. In various embodiments, the foam forming composition comprises some amount of water, and accordingly the presence of foam forming composition within the field of view of a capacitive sensor may influence the capacitance detected by the capacitance sensor. In various embodiments, the sensing apparatus may comprise a target capacitance sensor having a field of view encompassing a target region for which the sensor is configured to detect the presence of foam forming composition, and an ambient sensor spaced some distance away from the target sensor and configured to detect the capacitance of an ambient area that does not include any foam forming composition. Each of the capacitance sensors may provide an output signal (e.g., an output voltage signal) indicative of a capacitance measured by the respective capacitance signal. The output signals of each of the capacitance sensors may be electronically communicated (e.g., via Inter-Integrated Circuit (I2C) communication, Serial Peripheral Interface (SPI) communication, RS232 standard communication, and/or the like) to an onboard controller 12 (e.g., one or more integrated circuits, microcontrollers, and/or the like). The onboard controller 12 may be configured to determine whether a difference between the target output signal and the ambient output signal satisfies one or more capacitance criteria. A determination that the difference between the target output signal and the ambient output signal satisfies the one or more capacitance criteria may be indicative of the presence of foam forming composition within the field of view of the target sensor. For example, upon a determination that the target capacitance exceeds the ambient capacitance by at least a threshold amount, the onboard controller 12 may be configured to provide an output signal indicative of the presence of foam forming composition within the field of view of the target sensor. The output signal may be a digital output signal, or it may be an analogue output signal indicative of the sensed target capacitance and the ambient capacitance. In various embodiments, the target sensor may be spaced a distance away from an external surface of a container-forming layer such that a gap of air exists between the surface of the sensor and the external surface of the container-forming layer, and the field of view of the target sensor may encompass at least a portion of the container-forming layer and a region of the container interior. A discussion of utilizing capacitive sensors to detect the presence of a liquid within a container spaced a distance away from a sensor is provided in co-pending U.S. patent application Ser. No. 14/504,136, which is incorporated herein by reference in its entirety.

Although the sensors discussed herein are discussed in reference to detecting the temperature (or water content) of a foam forming composition within a plastic bag or other container defined by one or more container-forming layers, in various embodiments, such sensors may be utilized to detect the presence of foam forming composition that is not confined within a container, and/or foam forming composition that is at least partially confined within other containers, packages, or other words used herein interchangeably, for which the container is defined by one or more container boundaries comprising a material configured to conduct a detectable amount of heat through the container boundaries to permit detection of location-specific temperatures (or water content) of regions within the container. For example, various sensor apparatuses 10 may be utilized to detect the presence of foam forming composition through containers having thin paper, thin cardboard, fabric, metal, organic, inorganic, or other material types that do not substantially impede heat transmission through the material to permit location-specific temperature measurements. For example, various sensor apparatuses 10 may be utilized to detect the presence of foam forming compositions through thin cardboard boxes, foil packets, paper packets, fabric bags, and/or the like.

Moreover, various sensors may be utilized to detect the presence of materials and/or compositions emitting heat (and/or having some water content) other than foam forming compositions. For example, various sensor apparatuses may be utilized to detect the presence of pre-heated liquids, gels, and/or solids within the field of view of a sensor.

Example Uses

The below subsections provide discussions of specific example embodiments utilizing one or more sensor apparatuses such as those described herein.

Detection of Foam Forming Composition is Undesirable

As discussed herein, various embodiments are directed to a foam dispensing apparatus 1 having one or more sensing apparatuses 10 positioned such that the field of view of the sensors 11 encompass an area in which foam forming composition should not be detected during normal, expected, and/or desirable operation of the foam dispensing apparatus 1. The foam forming composition may have a sticky consistency that may be conducive to adhering to various surfaces. Moreover, as the foam forming composition expands and hardens, the foam may expand to cover large surface areas of various objects and, if not confined within a bag, the foam may expand into small crevices of various objects and may harden in these small crevices. The foam may thereby cause damage to sensitive electronic and/or mechanical components onto which the foam hardens, and the foam may be difficult and time consuming to remove once the foam has hardened. Accordingly, detection of foam forming composition at a location before the foam forming composition undesirably exits a container (e.g., a bag) and/or before the expanding foam forming composition contacts one or more components of a dispensing apparatus 1 positioned within a container interior defined between one or more container-forming layers, such that remedial action may be taken to minimize and/or prevent any damage caused by the foam contacting sensitive mechanical and/or electronic components may be desired.

Accordingly, one or more sensor apparatuses 10 may be positioned within a foam dispensing apparatus 1 at a position to detect foam forming composition while the foam forming composition is still positioned within a container interior (e.g., within a bag formed between two or more container-forming layers 100) but at a location where, if permitted to expand, the foam forming composition is likely to expand beyond the confines of the container and into undesirable locations outside of the container. The one or more sensor apparatuses 10 may be secured relative to one or more components of a dispensing apparatus 1.

Figure 5:
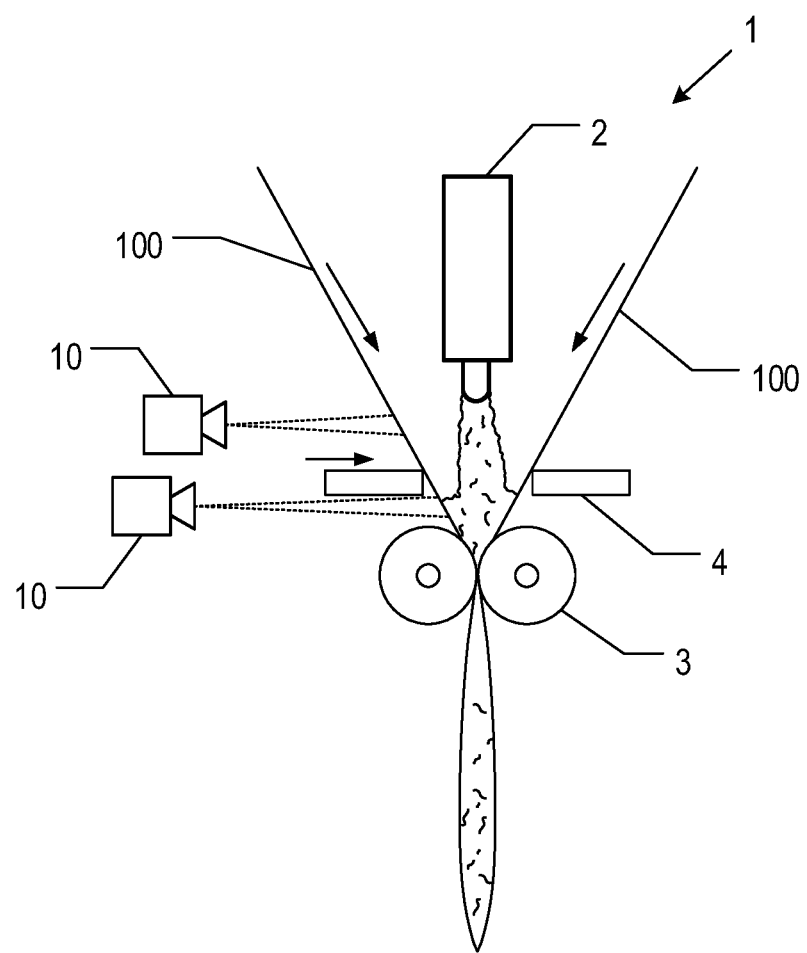
FIG. 5 is a schematic diagram of a side-view of various components of a dispensing apparatus according to some example embodiments.
Figure 6A:
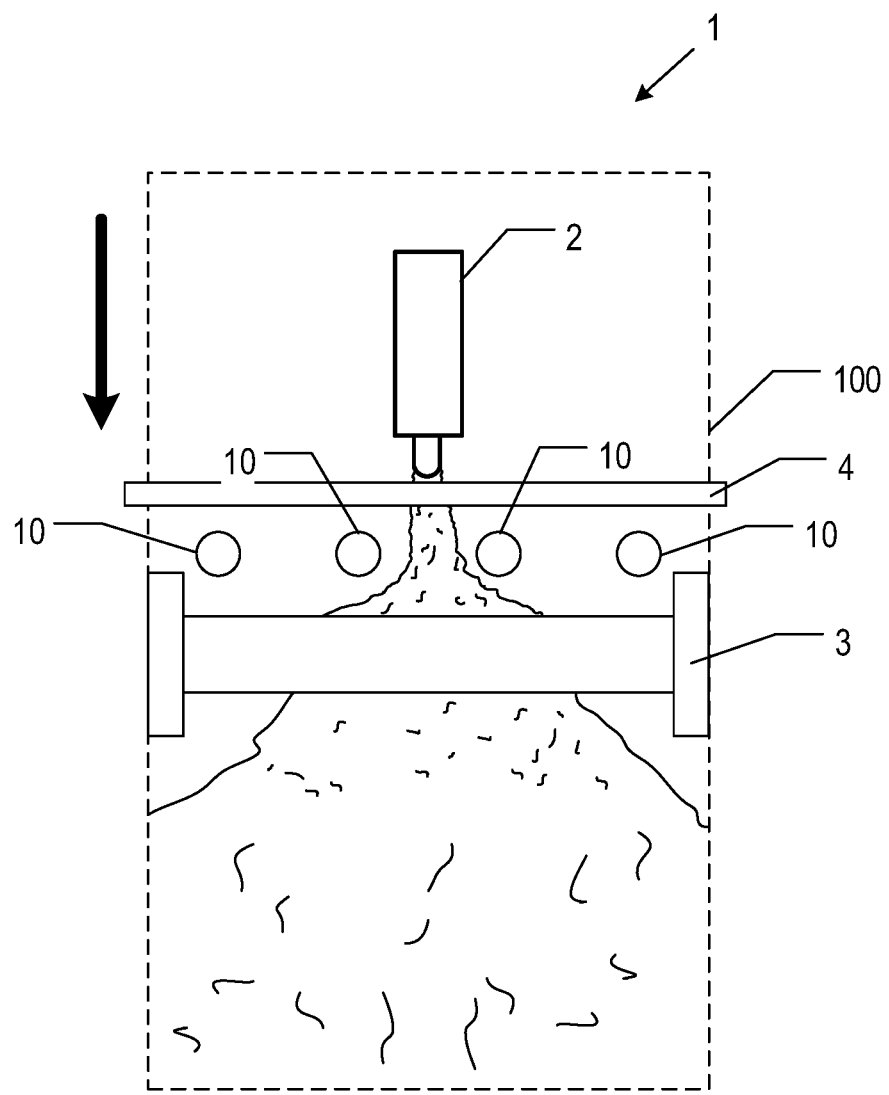
FIGS. 6A-6B are diagrams of a front view of various components of a dispensing apparatus according to some example embodiments.
Figure 6B:
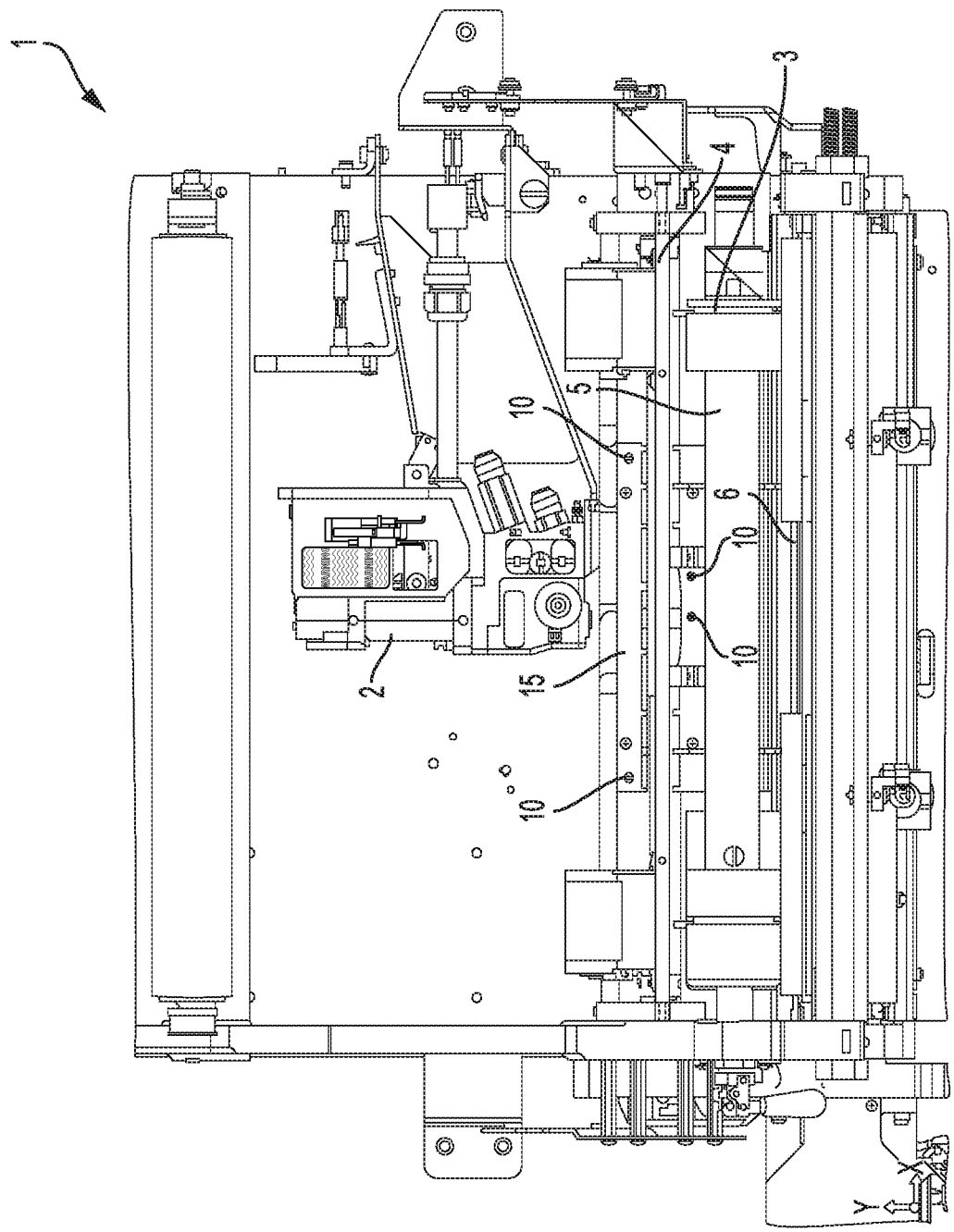
Figure 10:
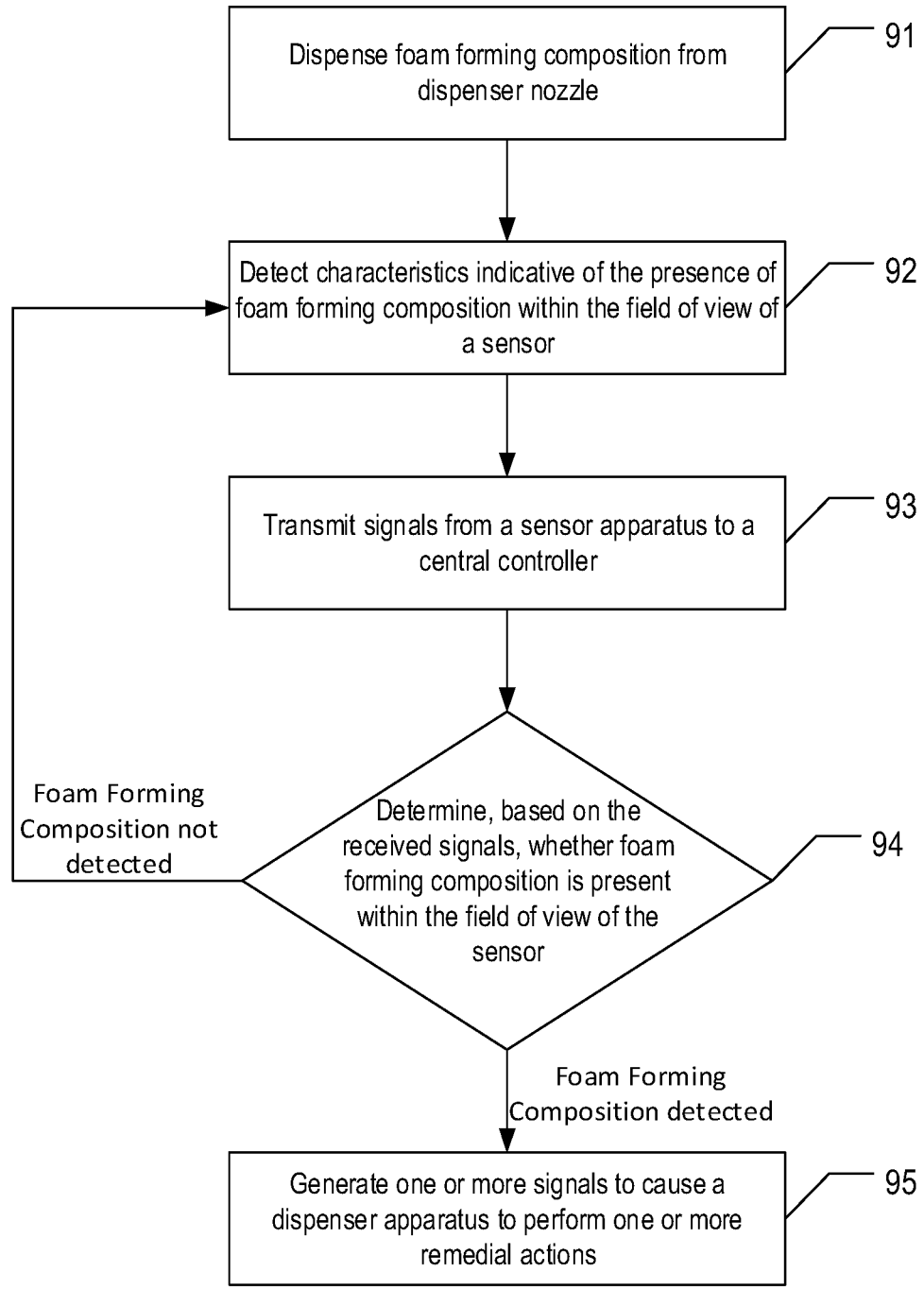
FIG. 10 is a flowchart illustrating various steps of a method according to some example embodiments.

FIGS. 5 and 6A-6B are illustrations showing embodiments in which one or more sensor apparatuses 10 are positioned within a dispensing apparatus 1 at locations to detect foam forming composition expanding into undesirable locations, and FIG. 10 provides a flow chart illustrating various steps in detecting the presence of foam forming composition at an undesirable location.

As shown in FIG. 5, the dispensing apparatus 1 may comprise a dispensing nozzle 2 configured to dispense foam forming composition (as shown at step 91 in FIG. 10) located within the container interior defined between the travel paths of two or more container-forming layers 100 moving through the dispensing apparatus 1. The container forming layers 100 may move between drive wheels 3 (e.g., comprising an active drive wheel on one side of a container forming layer 100 and a driven wheel on an opposite side of a container forming layer 100 such that, collectively, the active drive wheel and the driven wheel engage the surface of the container forming layers 100 to drive the container forming layers 100 through the dispensing apparatus 1) and/or rollers (not shown), and between seal bars 4 (e.g., a heated seal bar comprising one or more seal wires and a sealing anvil) collectively configured to pinch the two or more container-forming layers 100 together and heat seal across the width of the container-forming layers 100 to form a sealed end of a container. In various embodiments, the seal bar 4 may be positioned upstream from the drive wheels 3 and/or rollers. In various embodiments the dispensing apparatus 1 may additionally comprise an edge sealing mechanism configured to heat seal longitudinal edges of the container-forming layers 100 (parallel to the direction of travel of the container-forming layers). In various embodiments, the edge sealing mechanism may be embodied as the drive wheels (e.g., one of the active drive wheel and/or the driven wheel comprises a heated surface, and the other of the active drive wheel and/or the driven wheel is a heat sealing anvil). Although not shown in FIG. 5, various embodiments may additionally comprise a cutting mechanism configured to sever sealed containers from the moving web of container-forming layers 100 and/or a perforator configured to perforate the container-forming layers 100 between sealed containers, for example, to facilitate later separation thereof.

As shown in FIG. 5, which provides a side-schematic view of various components of a dispensing apparatus 1, the one or more sensor apparatuses 10 may be positioned between the dispensing nozzle 2 and the seal bars 4 along the travel path of the container-forming layers 100. As yet another example, the sensor apparatuses 10 may be positioned between the drive wheels 3 and the seal bars 4. Moreover, as shown in FIG. 5, a first set of sensors 10 may be positioned between the seal bars 4 and the nozzle 2, and a second set of sensors 10 may be positioned between the seal bars 4 and the drive wheels 3. Accordingly, sensor apparatuses 10 may be positioned such that the field of view of the corresponding sensors comprises at least a portion of the container-forming layer 100 travel path located between the dispensing nozzle 2 and the heat seal bars 4. In such configuration, the sensor apparatuses 10 may be configured to detect foam forming composition (as shown at step 92 in FIG. 10) that expands out of a formed container (e.g., in a direction opposite the direction of travel of the container-forming layers 100) and past the heat seal bars 4, but before the foam forming composition expands to the drive wheels 3 and/or the dispensing nozzle 2.

In various embodiments, the dispensing apparatus 1 may be configured to mix the chemicals of the foam forming composition after the foam forming composition has been dispensed into the container, and thus past the one or more sensor apparatuses 10. In such embodiments, the foam forming composition does not substantially begin the exothermic expansion reaction until the foam forming composition is positioned within the formed container, and accordingly the one or more sensor apparatuses 10 may not detect the presence of the foam forming composition while it is dispensed past the sensor apparatuses 10. However, in various embodiments in which the foam forming composition begins the exothermic reaction before being dispensed into the container, the one or more sensor apparatuses 10 may be disabled or otherwise configured such that signals provided by the sensor apparatuses 10 are not utilized while the foam forming composition is initially dispensed past the sensor apparatuses 10, as discussed in greater detail herein.

FIGS. 6A-6B provide front-views of a dispenser apparatus 1 according to various embodiments. FIG. 6A provides a schematic view of an embodiment in which each of the sensor apparatuses 10 are at least substantially aligned across the width of the container-forming layer 100 travel path and between the drive wheels 3 and the seal bars 4. FIG. 6B provides a diagram showing an alternative configuration in which one or more sensor apparatuses 10 are positioned above the seal bars 4, and one or more sensor apparatuses 10 are positioned immediately below the seal bar 4, such that one or more of the sensor apparatuses 10 are configured to detect the presence of expanding foam forming composition before the foam forming composition reaches the seal bars 4. As shown in FIG. 6B, the sensor apparatuses 10 may be secured to a PCB 15, as discussed herein, such that the sensor apparatuses 10 are configured such that the field of views of the respective sensors extend through the PCB 15 and toward the container-forming layer 100 travel path.

Moreover, FIG. 6B illustrates various other components of a dispensing apparatus 1 according to various embodiments. As shown in FIG. 6B, the dispensing apparatus 1 may additionally comprise one or more smoothing rollers 5 configured to spread and/or mix the foam forming composition within the formed container, and/or one or more perforators 6 configured to perforate the container-forming layers 100 between formed containers. As shown in FIG. 6B, the one or more sensor apparatuses 10 may be positioned upstream of the smoothing rollers 5 and/or the perforator 6 (along the container-forming layer 100 travel path).

However, in various embodiments, the one or more sensor apparatuses 10 may be positioned at any of a variety of locations within the dispensing apparatus 1 in order to detect foam forming composition in undesirable areas within the dispensing apparatus 1. For example, the one or more sensor apparatuses 10 may be positioned between the nozzle 2 and the drive wheels 3, between the smoothing wheels 5 and the perforator 6, and/or the like.

In various embodiments, a plurality of sensing apparatuses 10 may be provided in order to simultaneously detect whether foam forming composition expands into a plurality of undesired areas. For example, a plurality (e.g., four) sensing apparatuses 10 may be positioned such that the corresponding fields of view of the sensing apparatuses encompass an area where foam forming composition is not expected to be present during normal operation of the dispensing apparatus. For example, the sensing apparatuses 10 may be positioned laterally across the width of the plastic plies 100 proximate the dispensing nozzle 2. For example, a first sensor may be positioned proximate a first side of a bag, a second sensor may be positioned proximate a second side of the bag opposite the first side, and third and fourth sensors may be positioned proximate the center of the bag between the first and second sides.

In various embodiments in which a sensor apparatus 10 is positioned to detect whether foam forming composition expands into undesirable locations, one or more sensing apparatuses 10 may be configured to monitor the temperature (or capacitance) within a field of view continuously, periodically, and/or in response to the occurrence of one or more trigger events, and to transmit data indicative of the monitored characteristics (e.g., temperature and/or capacitance) to a central controller 20 (as shown at step 93 in FIG. 10) continuously, periodically, and/or in response to the occurrence of one or more of the trigger events. For example, the one or more sensing apparatuses 10 may be configured to continuously transmit one or more output signals indicative of the presence (or absence) of foam forming composition to the central controller 20 of the foam dispenser 1. For example, the one or more sensing apparatuses 10 may transmit analogue output signals indicative of the detected FOV temperature and the detected ambient temperature, and/or the one or more sensing apparatuses 10 may be configured to transmit a digital output signal indicative of the detected presence (or absence) of foam forming composition within the field of view of the sensor 11.

As yet another example, the one or more sensing apparatuses 10 may be configured to periodically (e.g., every 25 milliseconds, every 0.5 seconds, every second, every 5 seconds, every 10 seconds, every 30 seconds, and/or the like) transmit an output signal (digital and/or analogue) to the central controller 20 of the dispensing apparatus 1.

In certain embodiments, the one or more sensing apparatuses 10 may be configured to transmit an output signal (digital and/or analogue) to the central controller 20 of the dispensing apparatus 1 upon the occurrence of a trigger event. For example, the central controller of the dispensing apparatus 1 may be configured to transmit an initiation signal to the sensing apparatus 10 to instruct the sensing apparatus to provide signals indicative of the sensor 11 output. In this regard, the sensor apparatus 10 may be configured to provide output to the central controller 20 upon the central controller 20 querying the sensing apparatus 10. As yet another embodiment, the sensor apparatus 10 may be configured to begin continuous and/or periodic output data transmission to the central controller 20 upon the occurrence of a trigger event, such as receipt of an initiation signal from the central controller 20. In such embodiments, the sensor apparatus 10 may continue to periodically or continuously transmit data to the central controller 20 until the occurrence of a termination event (e.g., the termination of an elapsed amount of time after initiation of data transmission, the receipt of a termination signal from the central controller 20, and/or the like).

As a specific example, the central controller 20 of a dispenser apparatus 1 may seek verification that foam forming composition is not detected by each of one or more sensor apparatuses 10 a predetermined period of time after foam forming composition is dispensed from a nozzle 2 of the dispenser apparatus 1. Accordingly, the central controller 20 may transmit an initiation signal to the sensor apparatus 10 a predetermined amount of time after the foam forming composition is dispensed from the nozzle 2 (e.g., a predetermined amount of time after the dispensing apparatus 1 begins dispensing the foam forming composition from the nozzle 2 or a predetermined period of time after the dispensing apparatus 1 stops dispensing the foam forming composition from the nozzle 2). Accordingly, the central controller 20 may receive one output signal from each of a plurality of sensor apparatuses 10 in response to the initiation signal. In certain embodiments, the central controller 20 may receive a plurality of output signals from each of the plurality of sensor apparatuses 10 (e.g., continuously or periodically). The central controller 20 may continue to receive output signals from each of the plurality of sensor apparatuses 10 (e.g., continuously or periodically) until the occurrence of a termination event, such as the transmission of a termination signal from the central controller 20 to each of the plurality of sensor apparatuses 10. In various embodiments, the central controller 20 may be configured to transmit a termination signal to each of the plurality of sensor apparatuses 10 after a predetermined period of time, after receiving output signals from each of the plurality of sensor apparatuses 10 indicative of a detected presence of foam forming composition, and/or the like. For example, the central controller 20 may transmit the termination signal to the one or more sensor apparatuses 10 after a predetermined amount of time regardless of whether signals indicative of the presence of foam forming composition are received. In yet other embodiments, the central controller 20 may transmit the termination signal to the one or more sensor apparatuses 10 after a predetermined amount of time has expired and signals indicating the presence of foam forming composition have not been received from one or more of the sensor apparatuses 10. In various embodiments, the central controller 20 may transmit the termination signal to the one or more sensor apparatuses 10 upon the determination that each of the sensor apparatuses 10 have transmitted signals indicative of a detected presence of foam forming composition.

In certain embodiments, the central controller 20 may continuously and/or periodically receive output signals from each of the one or more sensor apparatuses 10. In such embodiments, the central controller 20 may be configured to monitor the received output signals to determine whether the received output signals are indicative of a determined presence of the foam forming composition at various times (as shown at step 94 of FIG. 10). For example, the central controller 20 may be configured to monitor the received output signals a predetermined amount of time after the dispenser apparatus 1 dispenses foam from the nozzle 2 to determine whether the sensor apparatuses 10 detected the presence of foam a predetermined period of time after the dispensing of the foam. As yet another example, the central controller 20 may continually (e.g., continuously and/or periodically) monitor the received output signals to determine whether foam forming composition is detected by one or more of the sensor apparatuses 10.

In various embodiments, the central controller 20 may be configured to cause the dispensing apparatus 1 to perform one or more remedial actions upon a determination that the one or more sensing apparatuses 10 detect the presence of foam forming compositions (as shown at step 95 of FIG. 10). For example, the central controller 20 may be configured to cause the dispensing apparatus 1 to perform one or more remedial actions upon the detection of foam by one or more of the sensing apparatuses 10, regardless of the time when the foam forming composition has been detected. As yet another example, the central controller 20 may be configured to perform one or more remedial actions upon a determination that one or more of the sensing apparatuses 10 detected foam forming composition a predetermined amount of time after the dispensing apparatus 1 dispenses the foam from the nozzle 2.

As an example remedial action, the central controller 20 may be configured to send a signal to one or more drive motors configured to control the advancement of the container-forming layers 100 (e.g., by controlling the rotation of the drive wheels 3) in order to cause the drive motors to move a predetermined amount of the container-forming layers 100 out of the dispensing apparatus 1. By moving a predetermined amount of the container-forming layers 100 out of the dispensing apparatus 1, the portion of the container-forming layers 100 including the foam forming composition that is in an undesirable location is removed from the dispensing apparatus 1 before the foam forming composition expands into contact with other components (e.g., the nozzle 2, one or more drive motors, and/or the like) of the dispensing apparatus 1.

As yet another example remedial action, the central controller 20 may prevent the dispensing of further foam from the nozzle 2 until a user provides user input indicating that any problematic foam forming composition has been removed from the dispensing apparatus 1. As yet another example remedial action, the central controller 20 may operate one or more door latch solenoids, motors, and/or the like for various access hatches on the dispensing apparatus to open, such that any foam that may have entered the components of the dispensing apparatus 1 may be permitted to expand out of the machine, instead of expanding further into the dispensing apparatus 1. As yet another example remedial action, the central controller 20 may generate one or more visible and/or audible alerts to be presented to a user. For example, an alert message may be displayed on a user interface of a dispensing apparatus 1, and/or an alert sound may be emitted from a sound generator of the dispensing apparatus 1.

In various embodiments, a dispensing apparatus 1 may comprise a plurality of groups of sensing apparatuses 10 at various locations. For example, each group of sensing apparatuses 10 may be configured to detect the presence of foam forming composition at various locations. As a specific example, by utilizing multiple groups of sensing apparatuses 10, the central controller 20 may receive signals indicating whether the foam forming composition is expanding toward an undesirable location. For example, a first group of sensing apparatuses 10 may be positioned to detect whether foam forming composition has expanded to a first position within a container, a second group of sensing apparatuses 10 may be positioned to detect whether foam forming composition has expanded to a second position within the container, downstream of the first position (e.g., such that the foam forming composition expands past the first position before reaching the second position). For example, the first group of sensing apparatuses 10 may be configured to detect foam forming composition in an area proximate and upstream of an undesirable area, and the second group of sensing apparatuses 10 may be configured to detect foam forming composition in an undesirable area. For example, upon a determination that one or more of the first group of sensor apparatuses 10 detects the presence of foam forming composition, the central controller 20 may be configured to emit a warning alert to inform a user that foam forming composition is moving toward an undesirable area. Following this example, upon a determination that one or more of the second group of sensor apparatuses 10 detects foam forming composition, the central controller 20 may be configured to take additional remedial action, such as moving the container-forming layers 100 out of the dispensing apparatus 1, stopping the foam dispensing, opening one or more doors, and/or the like.

Detection of Foam Forming Composition is Desirable

Figure 7:
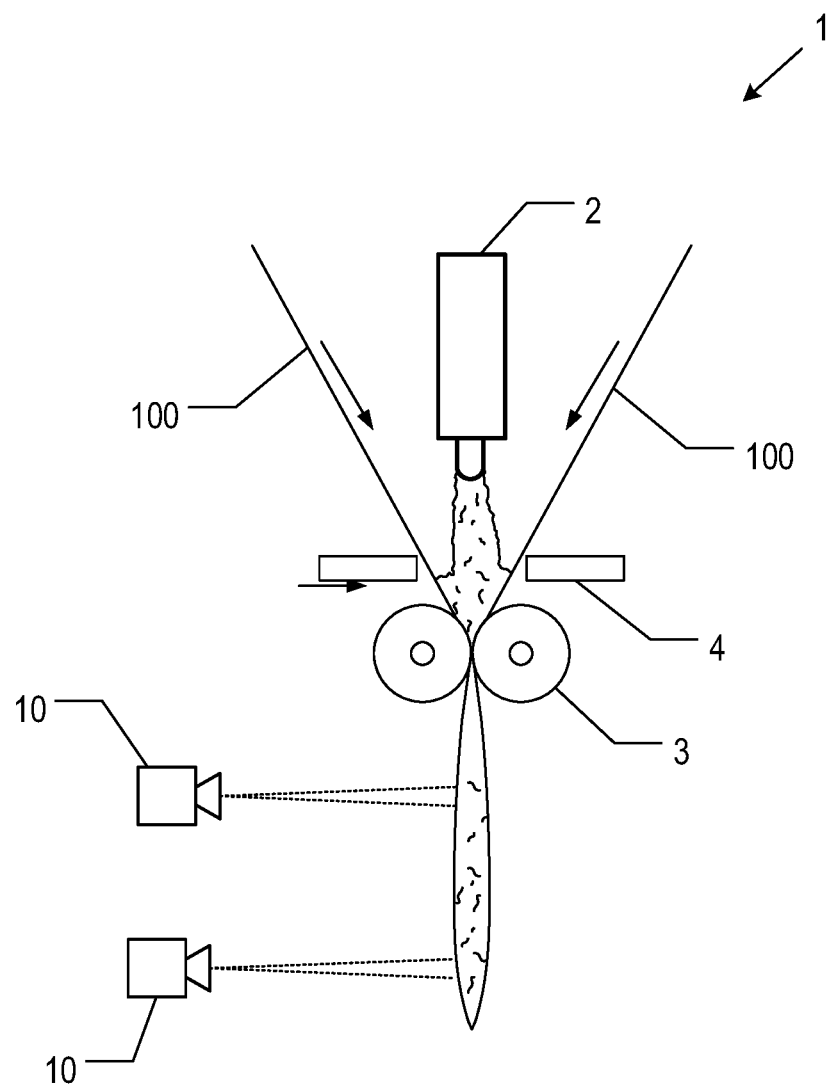
FIG. 7 is a schematic diagram of a side-view of various components of a dispensing apparatus according to some example embodiments.

In certain embodiments, one or more sensing apparatuses 10 may be positioned at a location such that the sensor 11 is configured to detect the presence of foam forming composition in a desirable area. In such embodiments, various components of a dispensing apparatus 1 (e.g., sensing apparatus 10 and/or central controller 20) may be configured to perform one or more steps in determining whether foam forming composition is present within the field of view of a sensor apparatus 10. Example steps in this regard are shown in the flowchart illustrated as FIG. 11. For example, as shown in FIG. 7, the one or more sensing apparatuses 10 may be positioned proximate a location where a sealed end of a bag is expected to be positioned, such that the sensor 11 may be configured to detect the presence of foam forming composition expanding toward the sealed end of the container (e.g., bag). With reference to FIG. 7, the one or more sensor apparatuses 10 may be positioned downstream of a dispensing nozzle 2, drive wheels 3, and/or seal bars 4 (along the container-forming layer 100 travel path). Although not shown in FIG. 7, the one or more sensor apparatuses 10 may be positioned downstream of smoothing rollers and/or perforators, and proximate the expected location of an end of a container (e.g., a sealed end of two or more container-forming layers 100).

Figure 8:
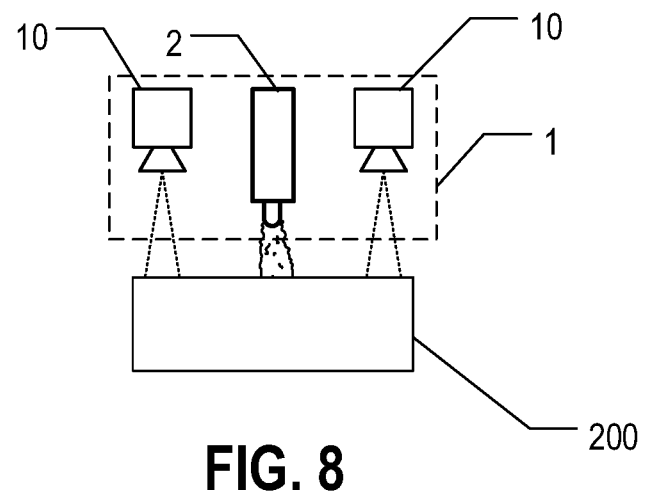
FIG. 8 is a schematic diagram of a side-view of various components of a dispensing apparatus according to some example embodiments.
Figure 9:
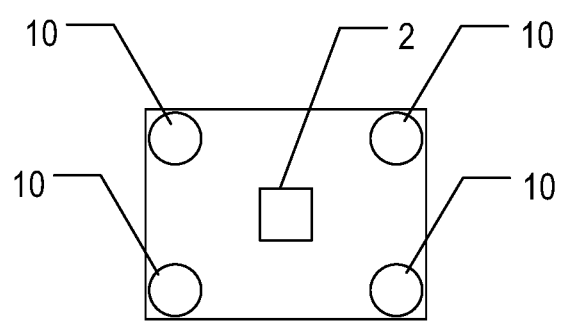
FIG. 9 is a schematic diagram of a top-view of various components of a dispensing apparatus according to some example embodiments.

As yet another embodiment, the one or more sensor apparatuses 10 may be positioned proximate a loading location for a rigid container 200 into which foam-in-bag packaging is placed, such that the sensor 11 is configured to detect whether foam forming composition expands into defined areas within the rigid container (as shown in FIGS. 8-9). For example, a sensor apparatus 10 may be positioned proximate one or more corners of a rigid container 200 (as shown in FIG. 9) in order to detect whether foam forming composition expands into the corners of the rigid container 200.

Figure 11:
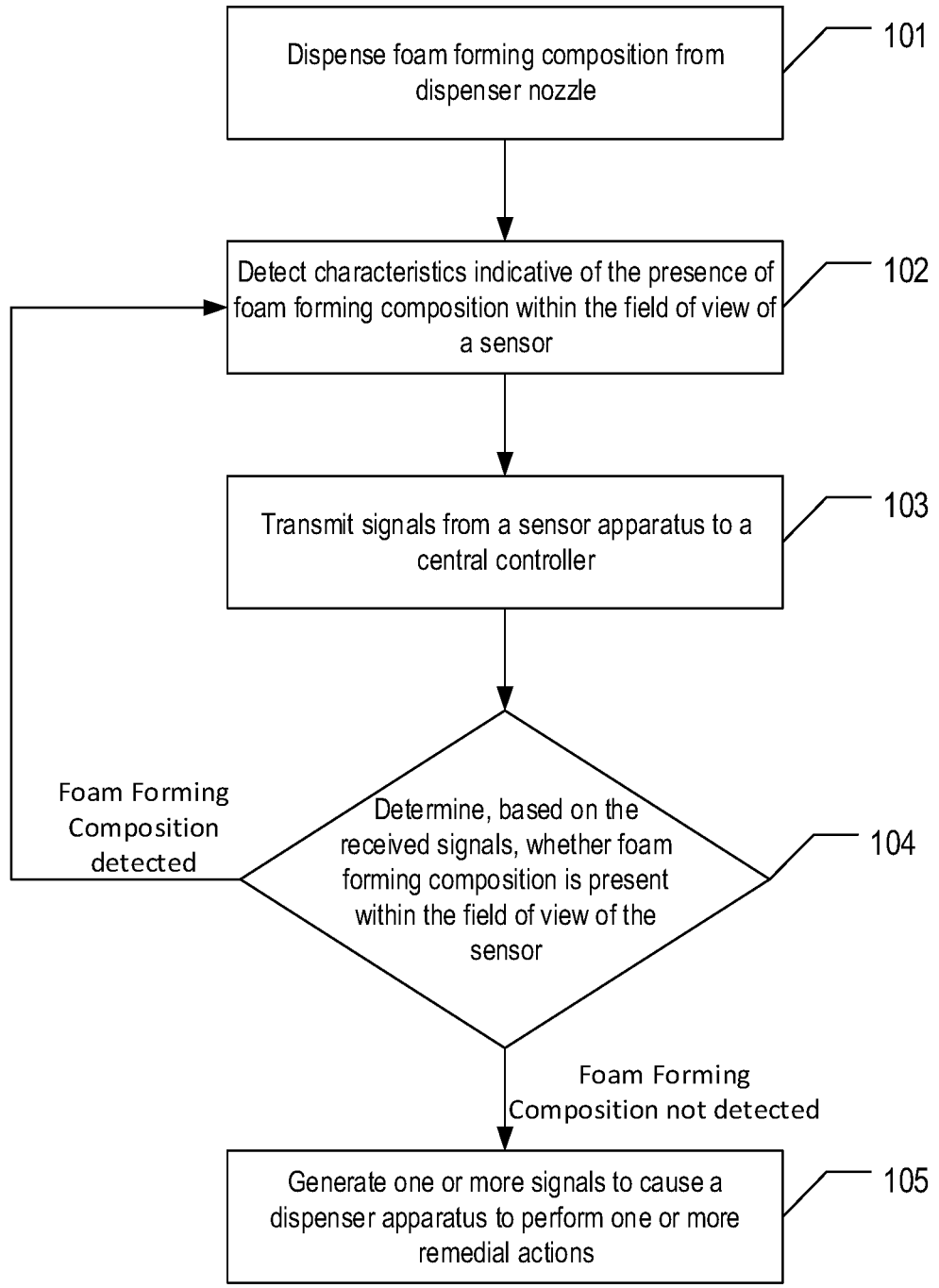
FIG. 11 is a flowchart illustrating various steps of a method according to some example embodiments.

In various embodiments, a plurality of sensing apparatuses 10 may be provided in order to simultaneously detect whether foam forming composition expands into a plurality of desired areas after the dispensing nozzle 2 dispenses foam forming composition (as shown at step 101 of FIG. 11). For example, a plurality (e.g., four) sensing apparatuses 10 may be positioned laterally adjacent an area where foam forming composition is expected to expand toward a sealed end of a container. For example, a first sensor may be positioned proximate a first container-forming layer and proximate a first side of a container proximate a sealed end of the container, a second sensor may be positioned proximate the first container-forming layer and a second side of the container opposite the first side and proximate the sealed end of the container, and third and fourth sensors may be positioned proximate the first container-forming layer and proximate the center of the container between the first and second sides and proximate the sealed end of the container.

In various embodiments in which a sensor apparatus 10 is positioned to detect whether foam forming composition expands into desirable locations, one or more sensing apparatus 10 may be configured to monitor the temperature (or capacitance) within a field of view continuously, periodically, and/or in response to the occurrence of one or more trigger events (as shown at step 102 of FIG. 11). Moreover, in various embodiments, the one or more sensing apparatus 10 may be configured to transmit signals indicative of the monitored characteristics of the sensing apparatus 10 (e.g., the temperature and/or capacitance detected within the field of view) to a central controller, as indicated at step 103 of FIG. 11. For example, the one or more sensing apparatuses 10 may be configured to continuously transmit one or more output signals indicative of the presence (or absence) of foam forming composition to the central controller 20 of the foam dispenser 1. For example, the one or more sensing apparatuses 10 may transmit analogue output signals indicative of the detected FOV temperature and the detected ambient temperature, and/or the one or more sensing apparatuses 10 may be configured to transmit a digital output signal indicative of the detected presence (or absence) of foam forming composition within the field of view of the sensor 11.

As yet another example, the one or more sensing apparatuses 10 may be configured to periodically (e.g., every 0.5 seconds, every second, every 5 seconds, every 10 seconds, every 30 seconds, and/or the like) transmit an output signal (digital and/or analogue) to the central controller 20 of the dispensing apparatus 1.

In certain embodiments, the one or more sensing apparatuses 10 may be configured to transmit an output signal (digital and/or analogue) to the central controller 20 of the dispensing apparatus 1 upon the occurrence of a trigger event. For example, the central controller 20 of the dispensing apparatus 1 may be configured to transmit an initiation signal to the sensing apparatus 10 to instruct the sensing apparatus 10 to provide data indicative of the sensor 11 output. In this regard, the sensor apparatus 10 may be configured to provide output to the central controller 20 upon the central controller 20 querying the sensing apparatus 10. As yet another embodiment, the sensor apparatus 10 may be configured to begin continuous and/or periodic output data transmission to the central controller 20 upon the occurrence of a trigger event, such as receipt of an initiation signal from the central controller 20. In such embodiments, the sensor apparatus 10 may continue to periodically or continuously transmit data to the central controller 20 until the occurrence of a termination event (e.g., the termination of an elapsed amount of time after initiation of data transmission, the receipt of a termination signal from the central controller 20, and/or the like).

As a specific example, the central controller 20 of a dispenser apparatus 1 may seek verification that foam forming composition is detected by each of one or more sensor apparatuses 10 a predetermined period of time after foam forming composition is dispensed from a nozzle 2 of the dispenser apparatus 10. Accordingly, the central controller 20 may transmit an initiation signal to the sensor apparatus 10 a predetermined amount of time after the foam forming composition is dispensed from the nozzle 2 (e.g., a predetermined amount of time after the dispensing apparatus 1 begins dispensing the foam forming composition from the nozzle 2 or a predetermined period of time after the dispensing apparatus 1 stops dispensing the foam forming composition from the nozzle 2). Accordingly, the central controller 20 may receive one output signal from each of a plurality of sensor apparatuses 10 in response to the initiation signal. In certain embodiments, the central controller 20 may receive a plurality of output signals from each of the plurality of sensor apparatuses 10 (e.g., continuously or periodically). The central controller 20 may continue to receive output signals from each of the plurality of sensor apparatuses 10 (e.g., continuously or periodically) until the occurrence of a termination event, such as the transmission of a termination signal from the central controller 20 to each of the plurality of sensor apparatuses 10. In various embodiments, the central controller 20 may be configured to transmit a termination signal to each of the plurality of sensor apparatuses 10 after a predetermined period of time, after receiving output signals from each of the plurality of sensor apparatuses 10 indicative of a detected presence of foam forming composition, and/or the like. For example, the central controller 10 may transmit the termination signal to the one or more sensor apparatuses 10 after a predetermined amount of time regardless of whether signals indicative of the presence of foam forming composition are received. In yet other embodiments, the central controller 20 may transmit the termination signal to the one or more sensor apparatuses 10 after a predetermined amount of time upon a determination that the predetermined period of time has expired and signals indicating the presence of foam forming composition have not been received from one or more of the sensor apparatuses 10. In various embodiments, the central controller 20 may transmit the termination signal to the one or more sensor apparatuses 10 upon the determination that each of the sensor apparatuses 10 have transmitted signals indicative of a detected presence of foam forming composition.

In certain embodiments, the central controller 20 may continuously and/or periodically receive output signals from each of the one or more sensor apparatuses 10. In such embodiments, the central controller 20 may be configured to monitor the received output signals to determine whether the received output signals are indicative of a determined presence of the foam forming composition at various times (as shown at step 104 of FIG. 11). For example, the central controller 20 may be configured to monitor the received output signals a predetermined amount of time after the dispenser apparatus 10 dispenses foam from the nozzle 2 to determine whether the sensor apparatuses 10 detected the presence of foam a predetermined period of time after the dispensing of the foam.

In various embodiments, the central controller 20 may be configured to cause the dispensing apparatus 1 to perform one or more remedial actions upon a determination that the one or more sensing apparatuses 10 do not detect the presence of foam forming compositions at predetermined times (as shown at step 105 of FIG. 11), for example, relative to the dispensing of the foam from the nozzle 2. For example, upon a determination that one or more sensing apparatuses 10 do not detect foam forming composition a predetermined period of time after the foam is dispensed from the nozzle 2, the central controller 20 may be configured to send a signal to one or more drive motors configured to control the advancement of the plastic plies 100 in order to cause the drive motors to move a predetermined amount of plastic out of the dispensing apparatus 1. As yet another example remedial action, the central controller 20 may prevent the dispensing of further foam from the nozzle 2 until a user provides user input indicating that any problematic foam forming composition has been removed from the dispensing apparatus 1. As yet another example remedial action, the central controller 20 may operate one or more door latch solenoids, motors, and/or the like for various access hatches on the dispensing apparatus 1 to open, such that any foam that may have entered the components of the dispensing apparatus 1 may be permitted to expand out of the machine, instead of expanding further into the dispensing apparatus 1. As yet another example remedial action, the central controller 20 may generate one or more visible and/or audible alerts to be presented to a user. For example, an alert message may be displayed on a user interface of a dispensing apparatus 1, and/or an alert sound may be emitted from a sound generator of the dispensing apparatus 1.

In various embodiments, a dispensing apparatus 1 may comprise a plurality of groups of sensing apparatuses 10 at various locations. For example, each group of sensing apparatuses 10 may be configured to detect the presence of foam forming composition at various locations. As a specific example, by utilizing multiple groups of sensing apparatuses 10, the central controller may receive signals indicating whether the foam forming composition is expanded along an expected path. For example, a first group of sensing apparatuses 10 may be positioned to detect whether foam forming composition has expanded to a first position within a bag, a second group of sensing apparatuses 10 may be positioned to detect whether foam forming composition has expanded to a second position within the bag, downstream of the first position (e.g., such that the foam forming composition expands past the first position toward the second position). In such embodiments, a plurality of individual groups of sensor apparatuses 10 may be utilized, such that the central controller 20 may receive signals indicative of the progress of the expansion of the foam forming composition.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

For example, various embodiments may comprise a plurality of sensor apparatuses 10 each configured to detect the presence of foam forming composition in various areas within a container and/or within a foam dispensing apparatus 1. For example, one or more sensor apparatuses 10 may be positioned at various locations within the foam dispensing apparatus 1 in order to detect the presence of foam forming composition that may have already exited a confining container. For example, a sensor apparatus 10 may be configured proximate the central controller 20 and configured to detect whether foam forming composition has contacted the central controller 20. As yet other examples, a first group of sensor apparatuses 10 may be configured to detect the presence of foam at desirable locations, and a second group of sensor apparatuses 10 may be configured to detect the presence of foam at undesirable locations. In such embodiments, the first group of sensor apparatuses 10 and second group of sensor apparatuses 10 may be configured to provide output signals to a single central controller 20 of the foam dispensing apparatus 1, and/or to a plurality of central controllers 20 of the foam dispensing apparatus 1.

That which is claimed:

1. A system for dispensing foam forming composition, the system comprising:
    a dispensing nozzle positioned within a container interior defined at least in part by at least two container-forming layers, the dispensing nozzle configured to dispense foam forming composition into the container interior; and
    at least one sensing apparatus comprising a temperature sensor positioned external to the container interior, wherein the sensing apparatus defines a detection field of view encompassing a portion of the container interior and a portion of the at least one container-forming layer, and the sensor apparatus is configured to:
        detect the presence of foam forming composition within the portion of the container interior within the detection field of view based at least in part on a detected temperature of the portion of the at least one container-forming layer positioned within the detection field of view; and
        detect an ambient temperature; and
    wherein the detection of the presence of foam forming composition within the portion of the container interior within the detection field of view is based at least in part on a comparison between the ambient temperature and the detected temperature of the portion of the at least one container-forming layer positioned within the detection field of view.

2. The system for dispensing foam forming composition of claim 1, wherein the temperature sensor is an infrared temperature sensor.

3. The system for dispensing foam forming composition of claim 1, wherein:
    the temperature sensor is configured to output a detection voltage indicative of the detected temperature of the portion of the at least one container-forming layer positioned within the detection field of view; and
    the sensing apparatus further comprises:
        a reference voltage source configured to output a reference voltage; and
        an onboard controller configured to:
            receive the detection voltage and the reference voltage,
            determine whether the detection voltage exceeds the reference voltage, and
            upon a determination that the detection voltage exceeds the reference voltage, generate a digital signal indicative of the presence of foam forming composition within the portion of the container interior within the detection field of view.

4. The system for dispensing a foam forming composition of claim 1, wherein the sensor apparatus further comprises an onboard controller configured to:
    receive signals from the sensor, wherein the signals comprise a first signal indicative of the detected temperature of the portion of the at least one container-forming layer positioned within the detection field of view and a second signal indicative of the detected ambient temperature; and
    generate an analogue signal indicative of the detected temperature of the portion of the at least one container-forming layer positioned within the detection field of view and the detected ambient temperature.

5. The system for dispensing foam forming composition of claim 1, wherein the sensing apparatus is positioned such that the detection field of view encompasses a portion of the container interior in which foam forming composition is not expected.

6. The system for dispensing foam forming composition of claim 5, further comprising a central controller configured to:
    receive signals from the sensing apparatus indicative of the presence of foam forming composition within the portion of the container interior within the detection field of view; and
    in response to receipt of a signal indicating that foam forming composition is present within the portion of the container interior within the detection field of view, cause the system to perform one or more remedial actions.

7. The system for dispensing foam forming composition of claim 6, wherein the one or more remedial actions are selected from:
    moving a portion of the at least two container-forming layers out of the system, or
    preventing the dispensing of foam forming composition from the nozzle.

8. The system for dispensing foam forming composition of claim 1, wherein the sensing apparatus is positioned such that the detection field of view encompasses a portion of the container interior in which foam forming composition is expected.

9. The system for dispensing foam forming composition of claim 8, further comprising a central controller configured to:
    receive signals from the sensing apparatus indicative of the presence of foam forming composition within the portion of the container interior within the detection field of view; and
    in response to receipt of a signal indicating that foam forming composition is not present within the portion of the container interior within the detection field of view, cause the system to perform one or more remedial actions.

10. The system for dispensing foam forming composition of claim 6, wherein the one or more remedial actions are selected from:
    moving a portion of the at least two container-forming layers out of the system, or
    preventing the dispensing of foam forming composition from the nozzle.

11. The system for dispensing foam forming composition of claim 1, wherein the at least one sensing apparatus comprises a plurality of sensing apparatuses each defining a corresponding detection field of view encompassing a portion of the container interior, wherein the detection fields of view of the plurality of sensing apparatuses do not substantially overlap.

12. The system for dispensing foam forming composition of claim 11, wherein the plurality of sensing apparatuses comprise:
    a first group of at least one sensing apparatus positioned at a first location; and
    a second group of at least one sensing apparatus positioned at a second location, wherein the detection fields of view corresponding to the at least one sensing apparatus of the second group are downstream of the detection fields of view corresponding to the at least one sensing apparatus of the first group, such that the first group of at least one sensing apparatus is configured to detect the presence of foam forming composition before the second group of at least one sensing apparatus.

13. The system for dispensing foam forming composition of claim 1, wherein the sensor apparatus further comprises an onboard controller configured to:
   determine a reference rate of temperature change within the detection field of view by calculating a temperature change over time between a first detected temperature and a subsequent second detected temperature;
   monitor an instantaneous rate of temperature change within the detection field of view by calculating a temperature change over time between at least two detected temperatures;
   determine whether the instantaneous rate of temperature change exceeds the reference rate of temperature change;
   upon determining that the instantaneous rate of temperature change exceeds the reference rate of temperature change, generate a data flag; and
   determine whether one or more generated data flags satisfy foam-presence criteria to determine whether the data flags are indicative of the presence of foam forming composition within the portion of the container interior within the detection field of view.

14. The system for dispensing foam forming composition of claim 13, wherein the foam-presence criteria comprises a minimum number of consecutively generated data flags.

15. A sensing apparatus configured to detect the presence of foam forming composition, the sensing apparatus comprising:
   a sensor positioned external to a container defined by one or more container walls and containing foam forming composition, wherein the sensor defines a detection field of view encompassing a portion of at least one container wall, and wherein the sensor is configured to detect a temperature of the portion of the container wall positioned within the detection field of view and to detect an ambient temperature; and
   one or more controllers comprising:
      an onboard controller configured to receive signals from the sensor, wherein the signals comprise a first signal indicative of the temperature of the portion of the container wall positioned within the detection field of view and a second signal indicative of the detected ambient temperature; and
      a central controller configured to receive an analogue signal from the onboard controller indicative of the temperature of the portion of the container wall positioned within the detection field of view and the detected ambient temperature, and to determine whether the analogue signal is indicative of the presence of foam forming composition within the container and adjacent the portion of the container wall.

16. The sensing apparatus of claim 15, wherein the one or more controllers are configured to:
   determine a reference rate of temperature change within the detection field of view by calculating a temperature change over time between a first detected temperature and a subsequent second detected temperature;
   monitor an instantaneous rate of temperature change within the detection field of view by calculating a temperature change over time between at least two detected temperatures;
   determine whether the instantaneous rate of temperature change exceeds the reference rate of temperature change;
   upon determining that the instantaneous rate of temperature change exceeds the reference rate of temperature change, generate a data flag; and
   determine whether one or more generated data flags satisfy foam-presence criteria to determine whether the data flags are indicative of the presence of foam forming composition within the container and adjacent the portion of the container wall.

* * * * *